(12) United States Patent  (10) Patent No.: US 7,450,252 B1
Idehara  (45) Date of Patent: Nov. 11, 2008

(54) METHOD AND DEVICE FOR PROCESSING IMAGE DATA

(75) Inventor: Takenori Idehara, Machida (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/482,684

(22) Filed: Jan. 14, 2000

(30) Foreign Application Priority Data

Jan. 14, 1999 (JP) ................................. 11-007609

(51) Int. Cl.
*H04N 1/40* (2006.01)
(52) U.S. Cl. ..................................... 358/1.13; 358/1.16
(58) Field of Classification Search ....... 358/1.13–1.14, 358/524, 1.16–1.17, 2.1; 382/233, 239
See application file for complete search history.

(56) References Cited

U.S. PATENT DOCUMENTS

| | | | | |
|---|---|---|---|---|
| 5,745,253 A | * | 4/1998 | Muramatsu et al. ......... 358/408 |
| 5,764,863 A | | 6/1998 | Fall et al. | |
| 5,779,378 A | * | 7/1998 | Kikuchi .................... 400/616.2 |
| 5,845,057 A | * | 12/1998 | Takeda et al. .............. 358/1.15 |
| 5,995,722 A | * | 11/1999 | Kishida .................... 358/1.15 |
| 6,097,419 A | * | 8/2000 | Morris et al. ............... 347/237 |
| 6,181,435 B1 | * | 1/2001 | Onodera .................... 358/1.14 |

FOREIGN PATENT DOCUMENTS

| | | |
|---|---|---|
| JP | 08-087392 A | 4/1996 |
| JP | 9-193486 | 7/1997 |
| JP | 09-231023 A | 9/1997 |
| JP | 10-044524 A | 2/1998 |

* cited by examiner

*Primary Examiner*—Thomas D Lee
*Assistant Examiner*—Stephen M Brinich
(74) *Attorney, Agent, or Firm*—Morrison & Foerster LLP

(57) ABSTRACT

A method of processing image data including the steps of receiving a printer language data, obtaining a bitmap data by developing the printer language data, obtaining a BM compressed data by compressing the bitmap data, comparing volumes of the printer language data and the BM compressed data and storing the image data of the smaller of two volumes while discarding the image data of the larger of two volumes.

3 Claims, 17 Drawing Sheets

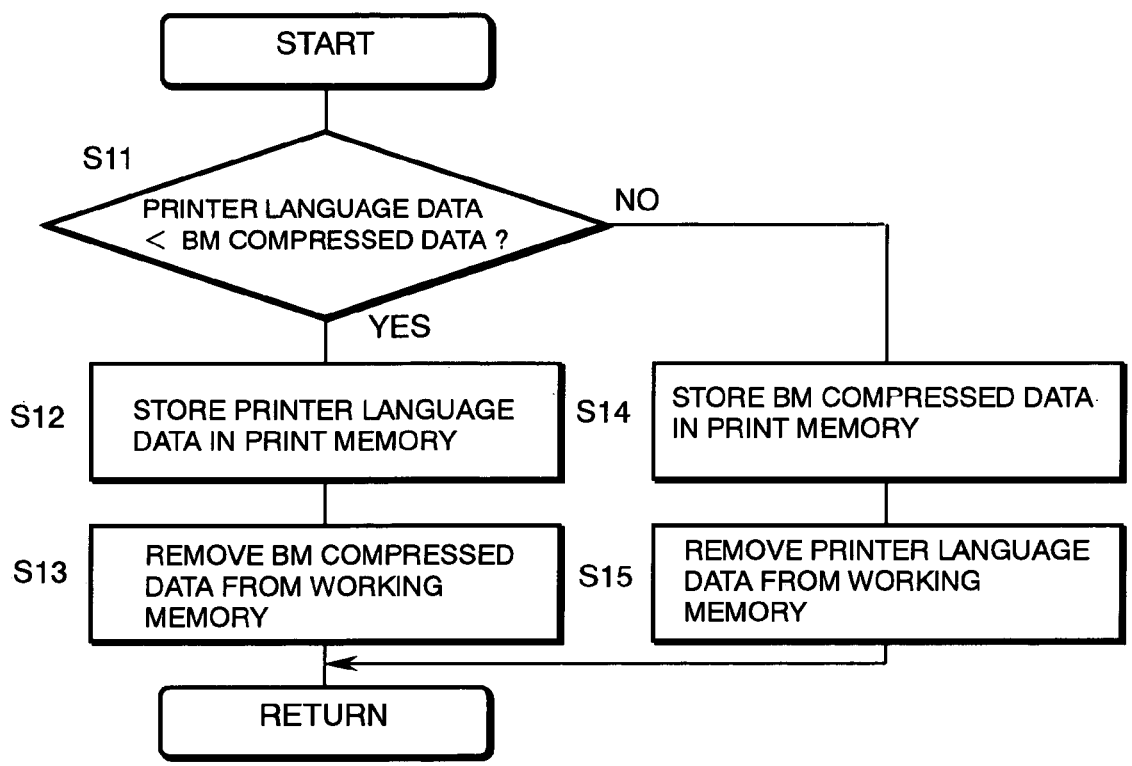
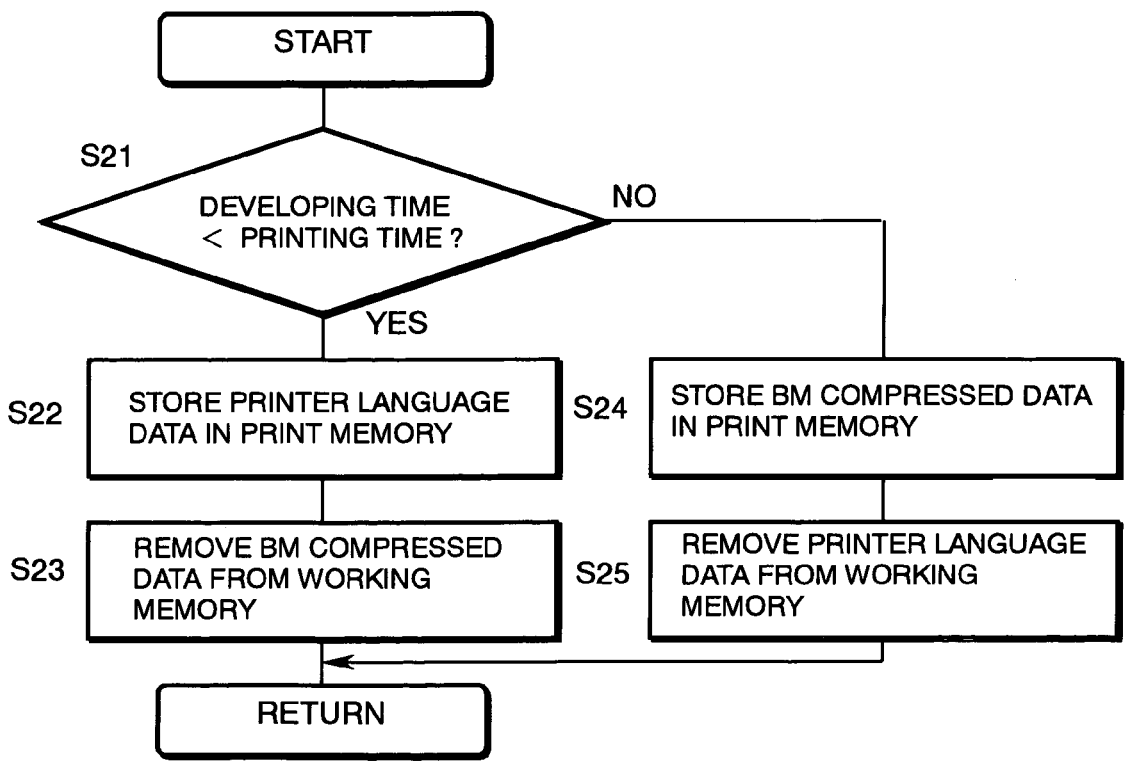

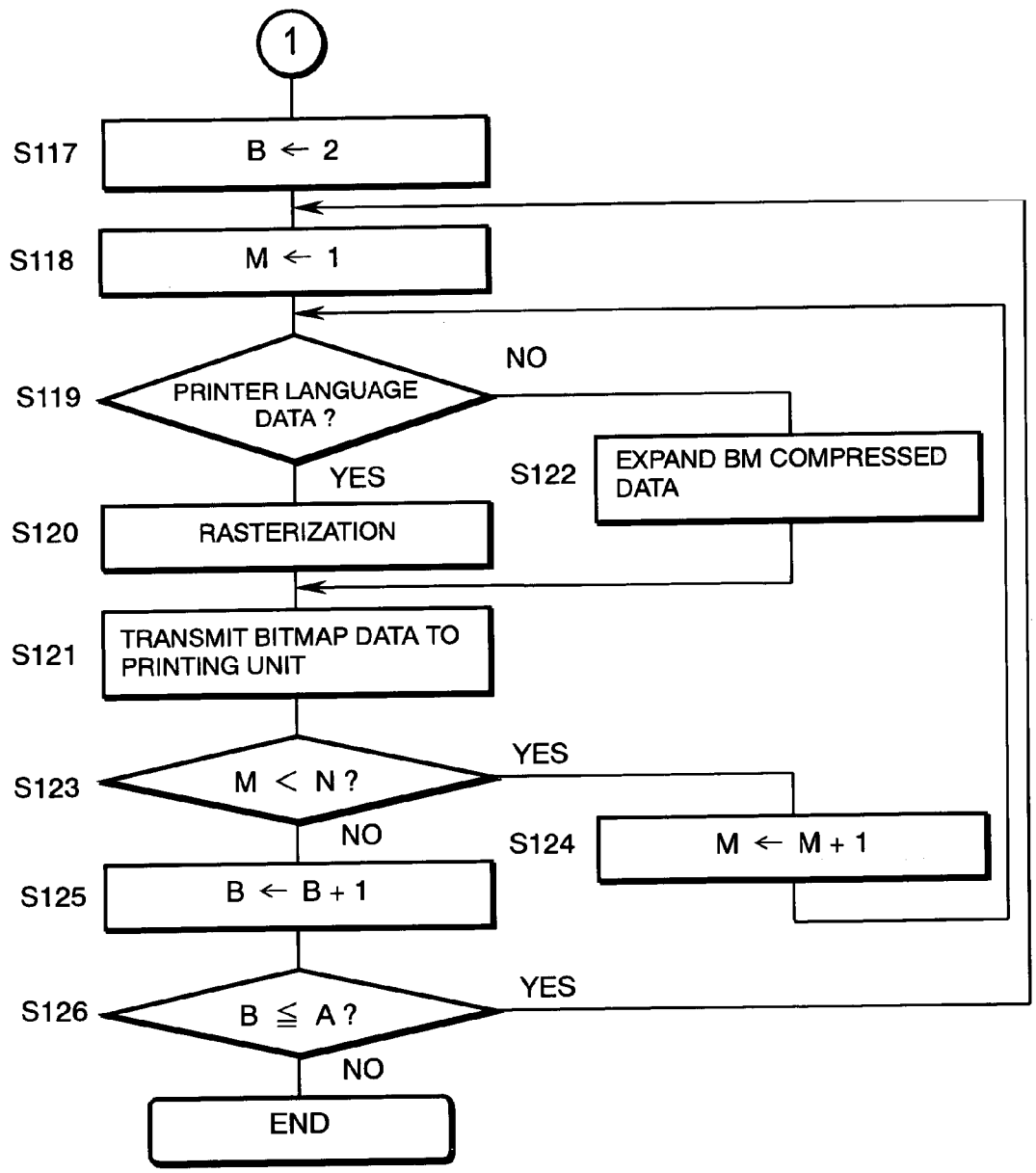

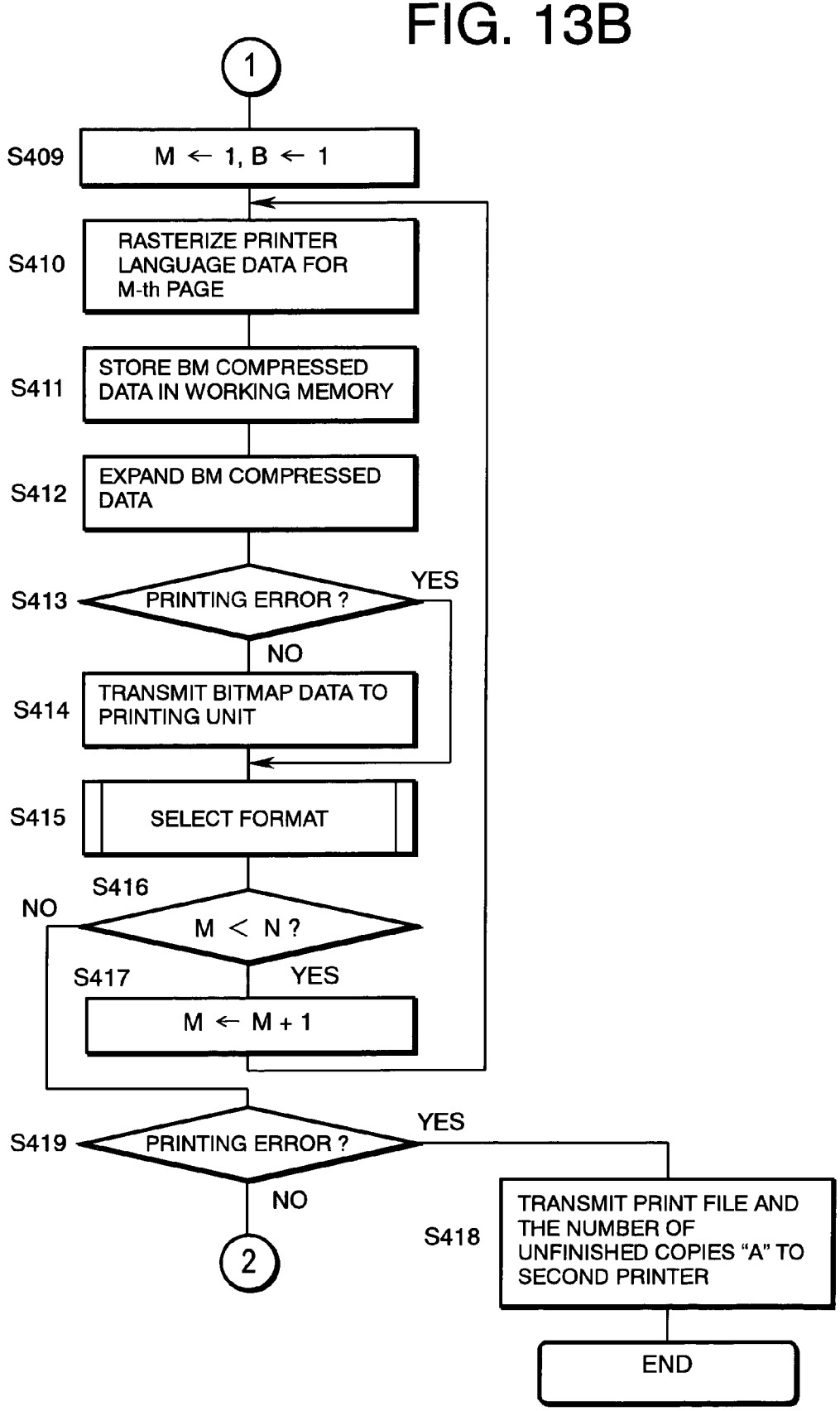

METHOD AND DEVICE FOR PROCESSING IMAGE DATA

This application is based on Japanese Patent Application No. 11-7609 filed on Jan. 14, 1999, the contents of which are hereby incorporated by reference.

BACKGROUND OF THE INVENTION

1. Field of the Invention

The invention relates to a method and a device for processing image data, in particular, a method and a device for printing a plurality of copies of data expediently.

2. Description of Related Art

A printer does not receive image data from a computer each time the printing of a copy is completed when printing a plurality of copies. The printer stores the image data it received in the first printing in a storage device and prints the second copy and the rest of the copies based on the image data stored in the storage device.

In printing a plurality of copies, there are two ways of formats for the image data stored in the storage device of the printer; the BM compressed format and the printer language format.

The BM compressed format is a format, where the printer language data, or the image data consisting of a printer language transmitted from the computer is developed into a bitmap data and the BM compressed data, or the data obtained by compressing the bitmap data is stored in the storage device. The BM compressed data needs to be extended in order for the image data to be printed.

The printer language format is a format, where the printer language data transmitted from the computer is directly stored in the storage device. The printer language data needs to be developed into a bitmap data in order for the image data to be printed.

The volume of the printer language data is normally smaller than the volume of the BM compressed data. From the standpoint of effectively using the storage device for storing the image data, it is advantageous to store it as a printer language data.

Various printers with the above consideration have been proposed recently. For example, a Publication of Unexamined Japanese Patent Application, JP-A-9-193486 discloses a printer, where an image data is stored as a printer language data in a storage device of the printer such as a hard disk device if the available capacity of the storage device is small, and the image data is stored as a BM compressed data if the available capacity of the storage device is sufficient.

However, such a printer is not always advantageous for the following two reasons:

First, a printer language data obtained by converting an image having graphics with PostScript may have a larger volume of data than a comparable BM compressed data. Therefore, storing an image data as a printer language data may not necessarily be an effective usage of the printer's storage device.

Secondly, an image data stored as a printer language data in the storage device may take too long to print. More specifically, the time required to develop a printer language data corresponding to one page of document into a bitmap data exceeds the time required to print a page of document, the time required for the printing process may become undesirably long.

The printing time, as mentioned here, is defined as the time span between the time point when the system begins to write a bitmap data corresponding to the current page of the document on a photoconductor of an electronic photography printer and the time point when it becomes possible to write the bitmap data of the next page. For example, a printer that is capable of printing 60 pages per minute, the printing time is one second.

On the other hand, in order to avoid the printing process time from elongating, it is desirable to store the image data in a storage device as a bitmap data, which does not require a developing time. However, uniformly storing all image data as bitmap data requires a storage device with a large capacity. It creates a problem for the effective usage of the storage device.

Consequently, the printers proposed in the past, such as a printer that uniformly stores all image data as printer language data due to the limited space available in the storage device such as a hard disk device used for storing image data, and a printer that uniformly stores all image data as BM compressed data do not have sufficient capabilities from the standpoint of the effective use of the storage devices and the shortening of the printing process.

Another types of printer that have the reprinting capability are also known. The reprinting function is a capability of a printer to print one copy of an image data as instructed by a computer and then print extra copies of the same image data without further instructions from the computer. More specifically, the reprinting capability enables the printer to execute the next printing based on the image data stored in the storage device during the first printing.

However, the printers equipped with the reprinting capability lack due considerations for the format of storing image data in the storage device as well. Thus, they do not have sufficient capabilities.

Another type of printers also known to the public are network printers that are capable of consigning printing jobs to different printers connected to the same networks. If printing of a plurality of copies is specified, a network printer can delegate the job of printing some of the copies to a different printer, or delegate to a different printer the rest of the work if printing cannot be continued due to a malfunction. The delegation of the printing jobs requires the transfer of the image data stored in the storage device of the network printer to the different printer.

However, these causes a problem associated with the data transfer time in addition to the aforementioned problems associated with the effective usage of the storage device and the printing process time. For example, if the volume of the printer language data is greater than the volume of the BM compressed data, the time required for transferring the image data consisting of the printer language data becomes large, and the network load increases. On the other hand, if all image data are uniformly stored as the BM compressed data, the volume of the BM compressed data usually becomes larger than the volume of the printer language data. In addition, the time required for transferring the image data consisting of the BM compressed data to a different printer becomes large.

SUMMARY OF THE INVENTION

It is an object of the present invention to provide a method of processing image data, which includes the steps of (a) receiving a first image data, obtaining a second image data by means of developing the first image data, (c) obtaining a third image data by means of compressing the second image data, (d) comparing a volume of the first image data and a volume of the third image data, and (e) storing the image data of the smaller of two volumes while discarding the image data of the larger of two volumes.

It is other object of the present invention to provide a device for processing image data, which includes a receiver, a first generator, a second generator, a comparator, and a storage means. The receiver receives a first image data consisting of a printer language data. The first generator generates a second image data consisting of a bitmap data by means of developing the first image data. The second generator generates a third image data by means of compressing the second image data. The comparator for comparing a volume of the first image data and a volume of the third image data. And, the storage means stores the image data of the smaller of two volumes while discarding the image data of the larger of two volumes.

A further object of the invention is to provide a method of processing image data, which includes the steps of (a) receiving a first image data, (b) obtaining a second image data by means of developing the first image data, (c) printing on a recording medium using the second image data, (d) comparing a first time required for developing the first image data and a second time required for printing with the second image data, and (e) storing the first image data if the first time is shorter than the second time based on the result of the comparison.

Still a further object of the invention is to provide an image data processing device, which includes a receiver, a generator, a transmitter, a comparator, and a storage means. The receiver receives a first image data consisting of a printer language data. The generator generates a second image data that consists of a bitmap data by means of developing the first image data. The transmitter for transmitting the second image data to a printing unit for printing the image data on a recording medium. The comparator compares a first time required for developing the first image data and a specified second time. And, the storage means stores the first image data if the first time is shorter than the second time based on the result of the comparison.

An even further object of the invention is to provide an image processing device, which includes a receiver, a first generator, a second generator, a transmitter, a comparing means and a storage means. The receiver receives a first image data consisting of a printer language data. The first generator generates a second image data consisting of a bitmap data by means of developing the first image data. The second generator generates a third image data by means of compressing the second image data. The transmitter transmits the second image data to a printing unit for printing the image data on a recording medium. The comparing means compares a first time required for developing the first image data and a specified second time. And, the storage means stores the first image data if the first time is shorter than the second time and storing the third image data if the first time is longer than the second time based on the result of the comparison.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 3 is a flowchart of a first mode for determining data formats based on comparisons between the volumes of a printer language data and a BM compressed data;

FIG. 4 is a flowchart of a second mode for determining data formats based on comparisons between printing time and time required for developing a printer language data into a bitmap data;

FIG. 8A and FIG. 8B are flow charts for the image data processing in the printer;

FIG. 13A through FIG. 13C are flow charts for the image data processing in a printer according to a fourth embodiment.

DETAILED DESCRIPTION OF THE EMBODIMENTS

The embodiments of this invention will be described below with reference to the accompanying drawings.

Embodiment 1

Figure 1:
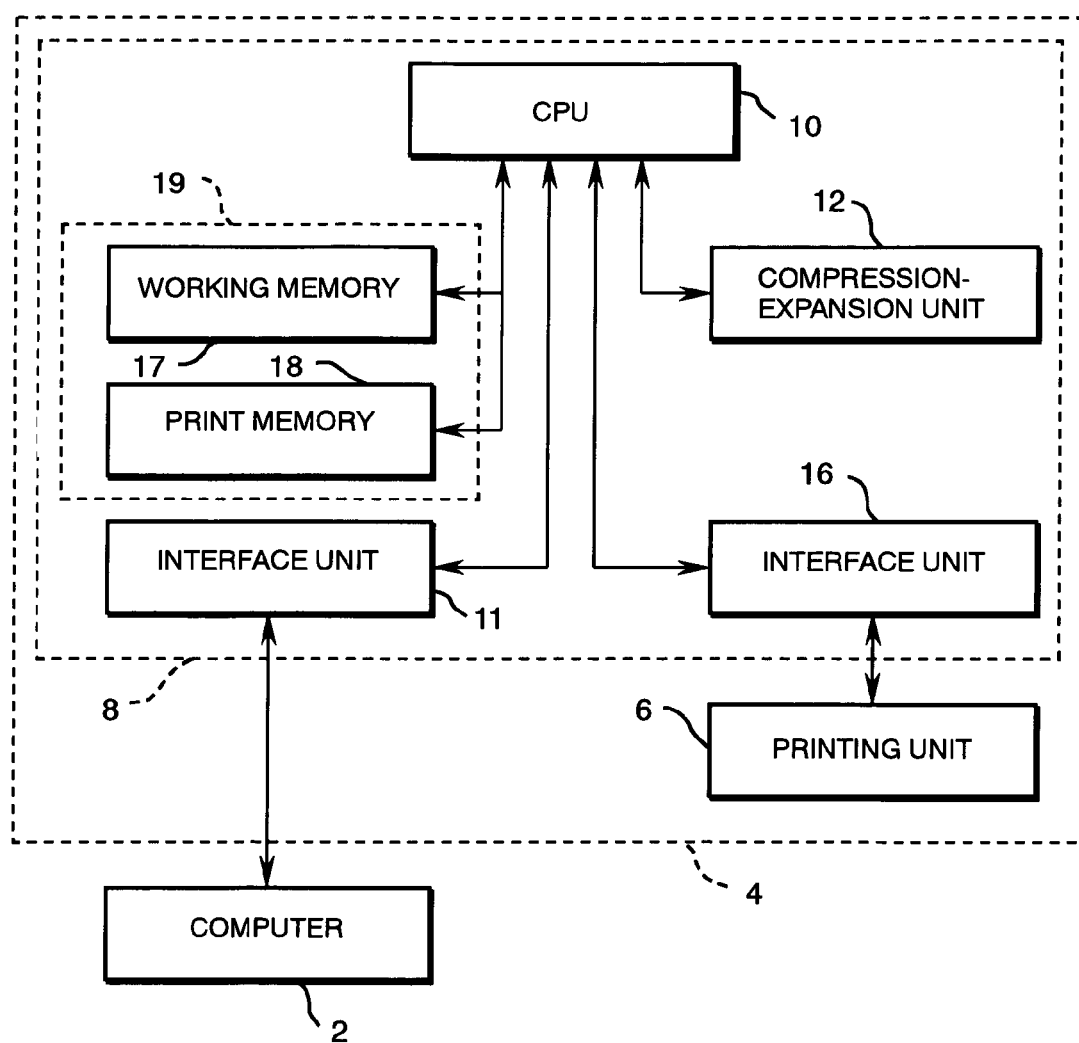
FIG. 1 is a schematic block diagram of a printer according to a first embodiment.

A printer 4 shown in FIG. 1 is not a type of printer that, depending on the space available on the storage device, uniformly stores image data as printer language data or as BM compressed data, i.e., data obtained by compressing bitmap data developed from printer language data. More specifically, the volume of the printer language data received is compared with the volume of the BM compressed data page by page to determine the data format for storing the image data. The stored image data form a print file as a whole. Printing of the second copy and the rest of the copies are executed based on the print file which is a mixture of printer language data and BM compressed data.

The printer 4 can be roughly divided into a printer controller 8 and a printing unit 6. The printer controller 8 receives printer language data transmitted from a computer 2, develops it to bitmap data, and transmits it to the printing unit 6. The printing unit 6 actually executes printing based on the bitmap data. Though the printer controller 8 is built inside the printer 4 in this embodiment, it can also be provided as an independent unit on the outside of the printer 4.

A CPU 10 is mainly in charge of controlling the printer controller 8, comparing volumes of the image data and/or printing times, and executes various arithmetic operations. An interface unit 11 is an interface between the computer 2 and the printer 4, and is used for receiving the printer language data transmitted by the computer 2. The printer language data thus received is rasterized by CPU 10, and converted into a bitmap data.

A compression-expansion unit 12 executes the process of compressing a bitmap data into a BM compressed data as well as the process of expanding a BM compressed data into a bitmap data. An interface unit 16 is an interface between the printer controller 8 and the printing unit 6, and transmits bitmap data to the printing unit 6.

A storage device 19 is equipped with a working memory 17 and a print memory 18. The print memory 18 stores the image data page by page in a format of either printer language data or BM compressed data. The data format for being stored in the print memory 18 is determined by the CPU 10. More specifically, the CPU 10 determines the data format based on the comparison between the volume of the printer language data and the volume of the BM compressed data, and/or the comparison between the time required for printing one page and the time required to develop one page of printer language data into a bitmap data.

As shown in the above, the printer language data transmitted by the computer 2 will be converted into a bitmap data, and transmitted to the printing unit 6 to generate a image data to be printed. Simultaneously, the image data will be stored page by page in the print memory 18 either as a printer language data or a bitmap data based on the comparison between the printer language data volume and the BM compressed data volume and/or the comparison between the printing time and the developing time. The data stored in the print memory 18, or the print file will be used for printing the second copy and the rest of the copies when a plurality of copies are to be produced.

Figure 2:
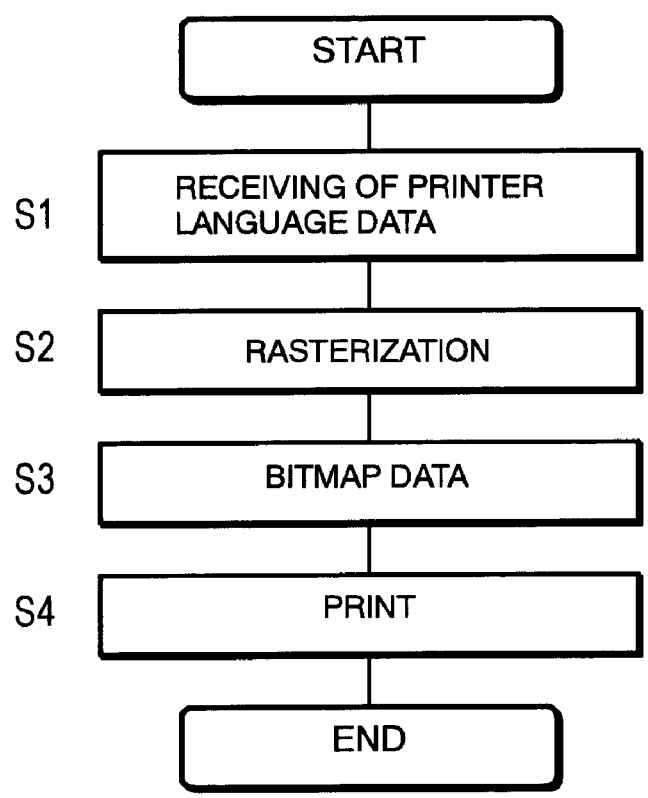
FIG. 2 is a schematic flowchart of the printer operation.

Now, the operation in the printer is described referring to FIG. 2.

The first step in the execution of a printing operation is receiving of a printer language data transmitted from the computer (Step S1). The printer language data is rasterized (Step S2), and developed into a bitmap data (Step S3). Next, the image data is printed based on the bitmap data (Step S4).

For printing a plurality of copies, the first copy is printed based on the printer language data transmitted from the computer. On the other hand, the second copy and the rest of the copies are printed, not based on the printer language data transmitted from the computer again, but based on the print file, which is a data consisting of a mixture of printer language data and BM compressed data, and stored in the print memory 18 while the first copy was printed.

Next, the mode for selecting the data format of the image data to be stored in the print memory 18 will be described in detail referring to FIG. 3 through FIG. 7.

The first mode shown in FIG. 3 comes from the standpoint of the reduction of the print file and the effective use of the storage device. Specifically, the printer language data volume is compared with the BM compressed data volume page by page and the data with the smaller volume of the two will be stored in the print memory 18. The specific process flow is as follows.

First, the printer language data volume is compared with the BM compressed data volume page by page (Step S11). If the printer language data volume is smaller than the BM compressed data volume, the printer language data will be stored in the print memory 18 (Step S12), and the BM compressed data will be removed from the working memory 17 (Step S13). On the other hand, if it is found that the BM compressed data volume is smaller than the printer language data volume, the BM compressed data will be stored in the print memory 18 (Step S14), and the printer language data will be deleted from the working memory 17 (Step S15).

The second mode shown in FIG. 4 comes from the standpoint of the prevention of the elongation of the printing process time. Specifically, the time required for printing one page of data is compared with the time required for developing one page of printer language data into a bitmap data. If the developing time is shorter than the printing time, the printer language data will be stored in the print memory 18. The specific processing flow is as follows.

First, the developing time is compared with the printing time (Step S21). If the developing time is shorter than the printing time, the printer language data will be stored in the print memory 18 (Step S22), and the BM compressed data will be deleted from the working memory 17 (Step S23). If the developing time is longer than the printing time, the BM compressed data will be stored in the print memory 18 (Step S24), and the printer language data will be deleted from the working memory 17 (Step S25).

The purpose of this process is as follows.

In order to execute printing of the second copy and the rest of the copies based on the printer language data stored in the print memory 18, it is necessary to develop the printer language data into a bitmap data. For example, the printing unit 6 begins to print actually when the bitmap data for the first page is written on a photoconductor provided in the printing unit 6. On the other hand, the printer controller 8 develops the printer language data for the second page stored in the print memory 18 into the bitmap data. If the development of the printer language data for the second page into a bitmap data is not finished by the time when the printing of the first page is completed and the photoconductor is ready for receiving the second page bitmap data, the process of the printing unit 6 stops temporarily. Since the process of the printing unit 6 is held up until the development is completed, the printing process time is elongated. In order to avoid this problem, in the second mode, the printer language data is stored into the print memory 18 only when the developing time is shorter than the printing time.

Figure 5:
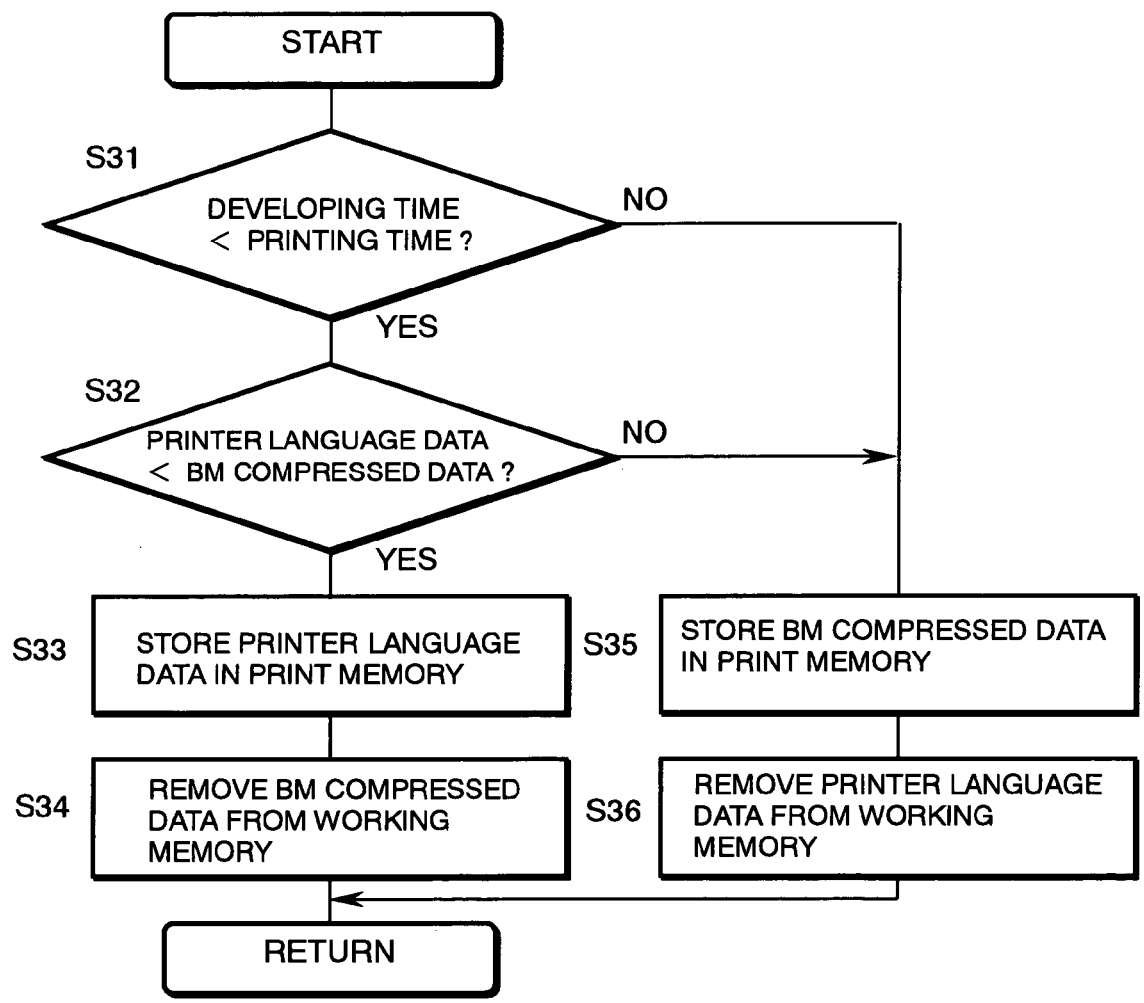
FIG. 5 is a flow chart of a third mode based on a combination of the first mode and the second mode.

The third mode shown in FIG. 5 is based on the combination of the first mode and the second mode. In other words, the third mode is based on the two thoughts. One is that the developing time needs to be shorter than the printing time in order to prevent the elongation of the printing process time. The other point is that it is undesirable to store the printer language data in the print memory 18 from the standpoint of effective use of the print memory 18, if the printer language data volume is larger than the BM compressed data volume. The specific process flow is as shown below.

First, the time required for printing one page of document is compared with the time required for developing the printer language data for the current page into a bitmap data (Step S31). If the developing time is shorter than the printing time, a further comparison between the printer language data volume and the BM compressed data volume is made (Step S32). If the printer language data volume is smaller than the BM compressed data, the printer language data is stored in the print memory 18 (Step S33), and the BM compressed data is deleted from the working memory 17 (Step S34).

On the other hand, if the developing time is longer than the printing time at Step S31, and the printer language data volume is larger than the BM compressed data volume at Step S32, the BM compressed data is stored in the print memory 18 (Step S35), and the print language data will be deleted from the working memory 17 (Step S36).

Figure 6:
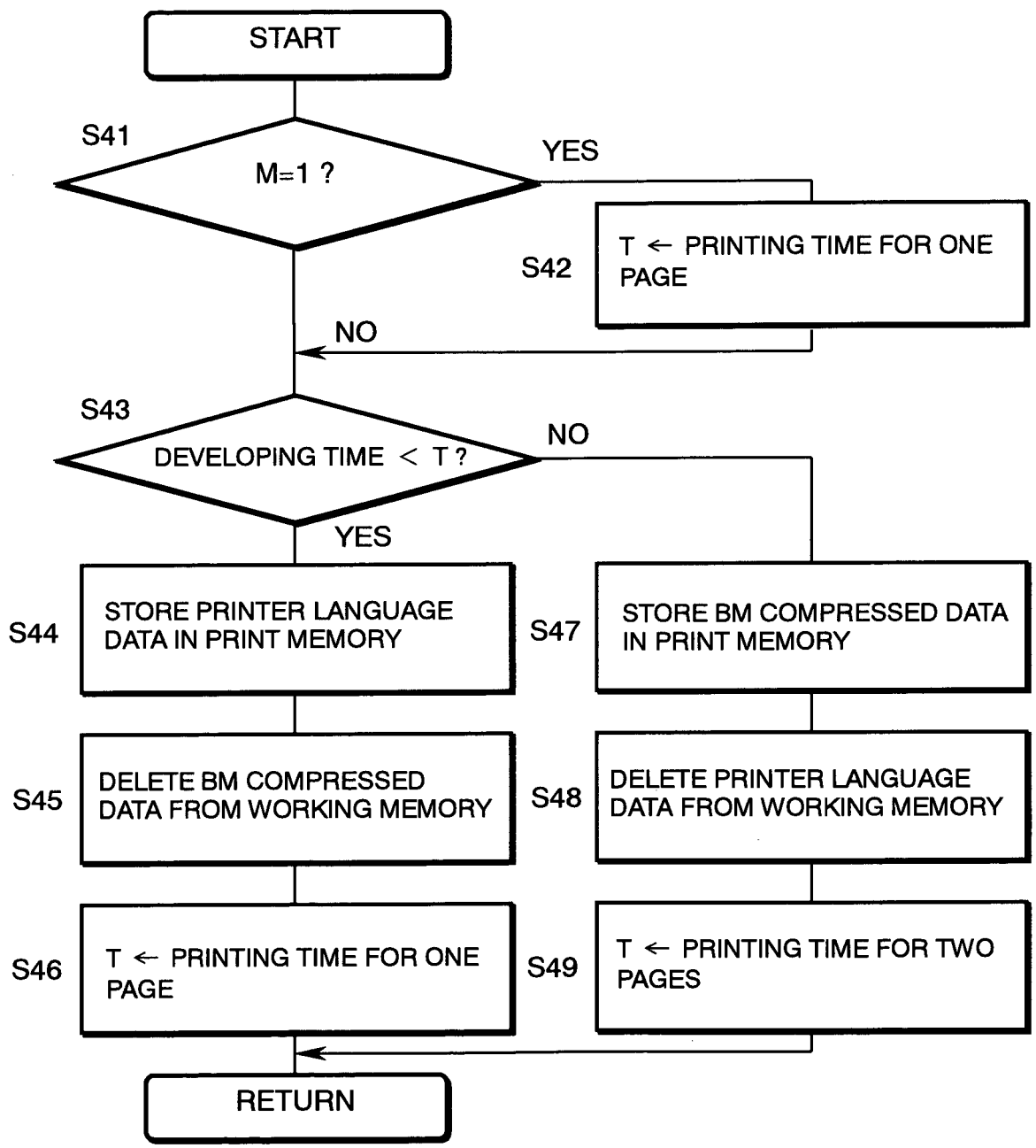
FIG. 6 is a flow chart of a fourth mode similar to the second mode.

The fourth mode shown in FIG. 6 is a modification of the second mode (FIG. 4), and is not based on a simple comparison between the time required for printing one page of document and the time required for developing the image data of the current page into the bitmap data. In the fourth mode, if the image data of the previous page is a BM compressed data, a comparison is made between the time required for printing two pages and the time required for developing the printer language data of the current page into a bitmap data based on the fact that it is not necessary to develop the printer language data of the previous page. When the developing time is shorter than the time required for printing two pages, the printer language data of the current page will be stored in the print memory 18. The meaning of this process is as follows.

For example, in the second mode, the image data for the second page will be stored as a BM compressed data if the printer language data for the second page cannot be developed into a bitmap data within the time required for printing one page related to the first page. Furthermore, if the printer language data for the third page cannot be developed into a bitmap data within the time required for printing one page related to the second page, the image data of the third page is stored as a BM compressed data.

However, since the second page image data is not stored as a printer language data in the print memory 18, it is not necessary to develop it into a bitmap data and the time required for developing the second page is negligible. Therefore, it is possible to conduct the process of developing the printer language data of the third page into a bitmap data from the time that the image data of the first page is printed. In other words, if the printer language data for the third page can be developed into a bitmap data within the time required for printing two pages related to the first and second pages, the process of the printing unit 6 does not stop. Thus, the elongation of the printing process can be avoided.

Next, the specific process flow will be described.

First, if the image data of the first page is the subject (Step S41), the printing time for one page is set to the base time "T" (Step S42). The base time "T" is compared with the developing time for the printer language data for the first page (Step S43). If the developing time is shorter than the base time "T," the printer language data for the first page will be stored in the print memory 18 (Step S44), and the BM compressed data for the first page will be deleted from the working memory 17 (Step S45). The printing time for one page will be set as the base time "T" for the second page (Step S46).

On the other hand, if the developing time is longer than the base time "T" at Step 43, the BM compressed data for the first page will be stored in the print memory 18 (Step S47), and the printer language data for the first page will be deleted from the working memory 17 (Step S48). Next, the printing time for two pages will be set as the base time "T"; for the second page (Step S49). Steps S43, S44, S45, S47 and S48 are identical to those in the second mode.

If the image data for the second and the rest of pages are the subject (Steps S41, S42), the base time "T" that has already been set will be compared with the developing time for the printer language data for the current page (Step S43). The base time "T" is the printing time for one page if the image data for the previous page is stored in the print memory 18 as a printer language data, and is a printing time for two pages if the image data for the previous page is stored in the print memory 18 as a BM compressed data. If the developing time for the printer language data for the current page is shorter than the base time "T" the printer language data for the current page will be stored in the print memory 18 (Step S44), and the BM compressed data for the current page will be deleted from the working memory 17 (Step S45). Next, the printing time for one page will be set as the base time "T" for the next page (Step S46).

On the other hand, if the developing time for the printer language data for the current page is found to be longer than the base time "T" at Step S43, the BM compressed data for the current page will be stored for the print memory 18 (Step S47), and the printer language data for the current page will be deleted from the working memory 17 (Step S48). Next, the printing time for two pages will be set up as the base time "T" for the next page (Step S49).

Figure 7:
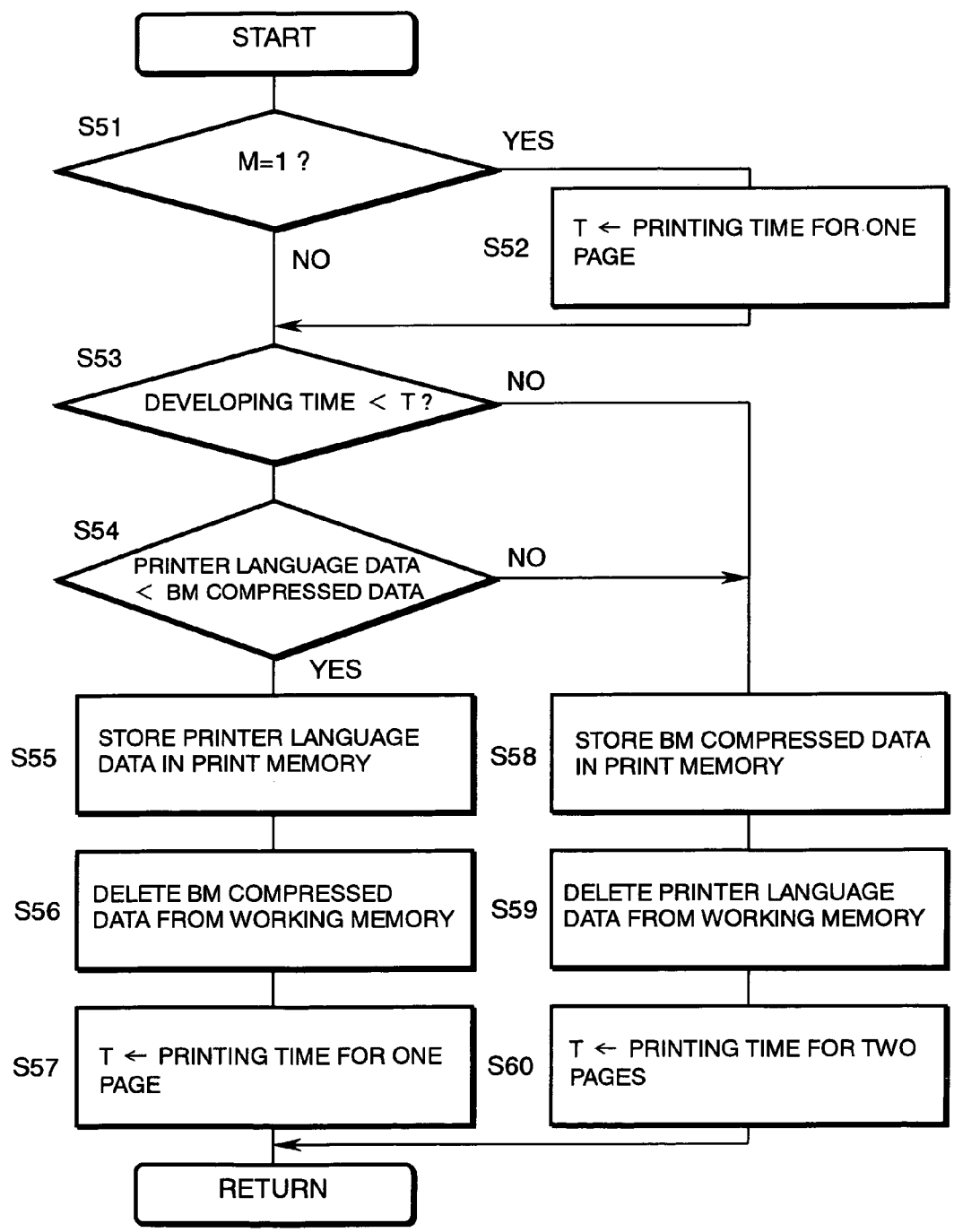
FIG. 7 is a flow chart of a fifth mode based on a combination of the first mode and the fourth mode.

Lastly, the fifth mode shown in FIG. 7 is based on the combination of the first mode (FIG. 3) and the fourth mode (FIG. 6).

Specifically, if the BM compressed data for the previous page is stored in the print memory 18, and the developing time for the print language data for the current page is shorter than the printing time for two pages, and the volume of the printer language data for the current page is smaller than the volume of the BM compressed data for the current page, the printer language data for the current page will be stored in the print memory 18. On the other hand, if the printer language data for the previous page is stored in the print memory 18, and the developing time for the print language data for the current page is shorter than the printing time for one page, and the volume of the printer language data for the current page is smaller than the volume of the BM compressed data for the current page, the printer language data for the current page will be stored in the print memory 18.

Now, the specific process flow is described.

First, if the image data of the first page is the subject (Step S51), the printing time for one page is set to the base time "T" (Step S52). The base time "T" is compared with the developing time for the printer language data for the first page (Step S53). If the developing time is shorter than the base time "T," the volume of the printer language data for the first page is compared with the volume of the BM compressed data of the first page (Step S54). If the volume of the printer language data for the first page is smaller than the volume of the BM compressed data of the first page, the printer language data for the first page will be stored in the print memory 18 (Step S55), and the BM compressed data for the first page will be deleted from the working memory 17 (Step S56). The printing time for one page will be set as the base time "T" for the second page (Step S57).

On the other hand, if the developing time for the printer language data for the first page is longer than the base time "T" at Step 53, and if the volume of the printer language data for the first page is larger than the volume of the BM compressed data at Step S54, the BM compressed data for the first page will be stored in the print memory 18 (Step S58), and the printer language data for the first page will be deleted from the working memory 17 (Step S59). Next, the printing time for two pages will be set as the base time "T" for the second page (Step S60). Steps S53, S54, S55, S56, S58 and S59 are identical to those in the third mode.

If the image data for the second and the rest of pages are the subject (Steps S51, S52), the base time "T" that has already been set will be compared with the developing time for the printer language data for the current page (Step S53). The base time "T" is the printing time for one page if the image data for the previous page is stored in the print memory 18 as a printer language data, and is a printing time for two pages if the image data for the previous page is stored in the print memory 18 as a BM compressed data. If the developing time for the printer language data for the current page is shorter than the base time "T," the volume of the printer language data for the current page will be compared with the volume of BM compressed data for the current page (Step S54). If the volume of the printer language data for the current page is smaller than the volume of BM compressed data for the current page, the printer language data for the current page will be stored in the print memory 18 (Step S55), and the BM compressed data for the current page will be deleted from the working memory 17 (Step S56). Next, the printing time for one page will be set as the base time "T" for the next page (Step S57).

On the other hand, if the developing time for the printer language data for the current page is found to be longer than the base time "T" at Step S53, and if the volume of the printer language data for the current page is larger than the volume of BM compressed data for the current page at Step S54, the BM compressed data for the current page will be stored in the print memory 18 (Step S58), and the printer language data for the current page will be deleted from the working memory 17 (Step S59). Next, the printing time for two pages will be set up as the base time "T" for the next page (Step S60).

Now, the image data process executed by the printer is described using an example of printing "A" copies of an image data having "N" pages.

Figure 8A:
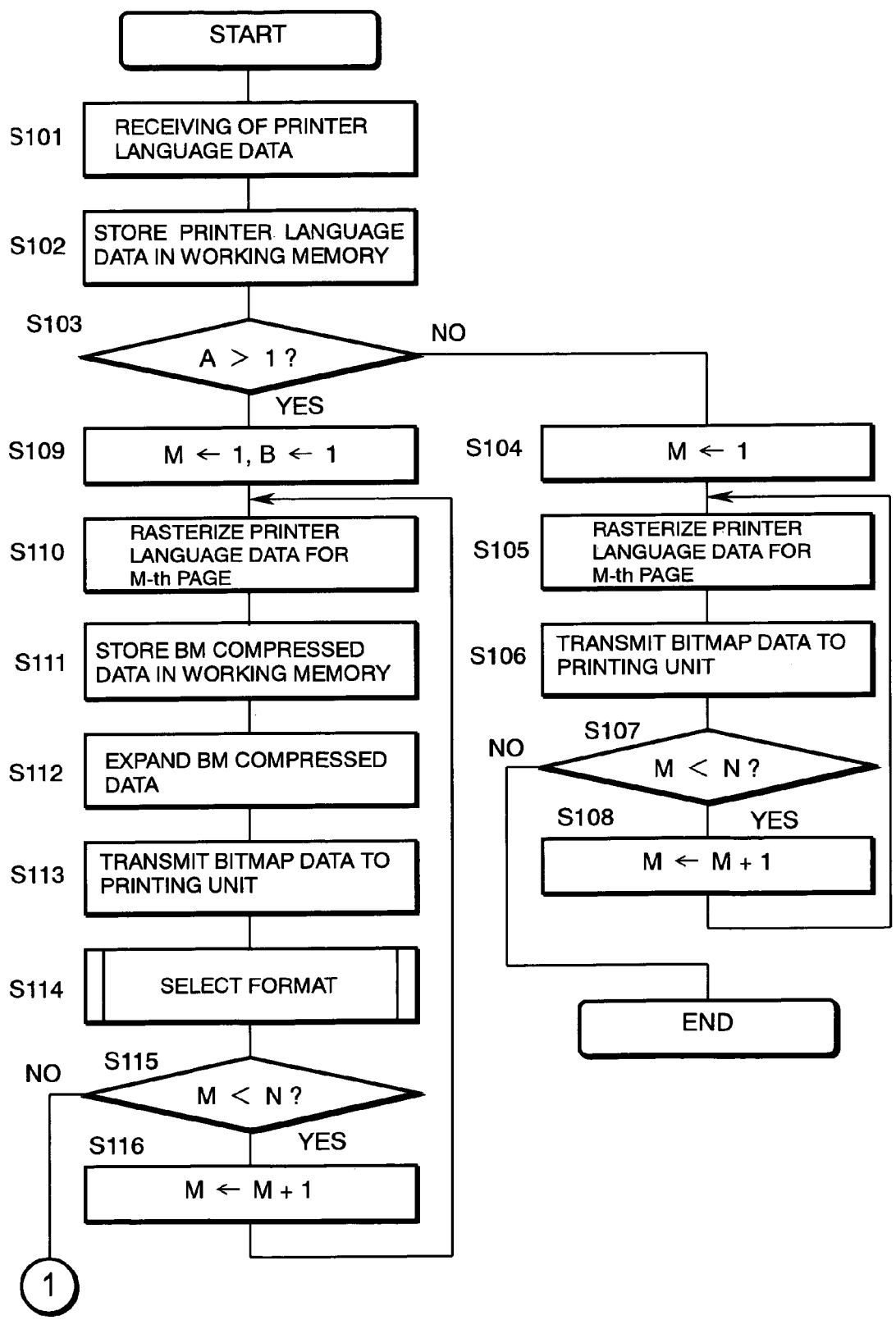

First, as shown in FIG. 8A, the information transmitted from the computer 2 concerning the print instruction including the printer language data, the number of copies "A" to be produced, and the number of pages per copy "N" is received through the interface unit 11 (Step S101), and the printer language data is stored in the working memory 17 (Step S102). Next, the number of copies "A" is compared with 1 (Step S103).

If the number of copies "A" is 1, printing is executed without storing the image data. More specifically, 1 is set to a variable "M" that represents a current page number that is controlled by the CPU 10 (Step S104), the printer language data for the first page is rasterized and developed into a bitmap (Step S105). The bitmap data is then transmitted to the printing unit 6 (Step S106). Next, the page number "N" is compared with the variable "M" (Step S107). If the page number "N" is larger than the variable "M," the variable "M" is incremented by 1 (Step S108), the process returns to Step S105, and the process of the printer language data for the second page begins.

Steps S105 through S108 are repeated until the variable "M" becomes equal to the number of pages "N." When the printing of the N-th page, which is the last page, is completed, it no longer holds the condition M<N, and the process ends (Step S107).

On the other hand, if the number of copies "A" is more than one at Step S103, the image data will be stored page by page into the print memory 18 as a BM compressed data or a printer language data according to the selected mode to form a print file in case of printing the first copy. The specific process flow is as follows.

First, at Step S109, 1 is set to the variable "B" and the variable "M" that respectively represent the copy and the page currently being processed (Step S109). Next, the printer language data for the first page of the first copy is rasterized and developed into a bitmap data (Step S110). The bitmap data is then compressed by the compression-expansion unit 12, and will be stored in the working memory 17 as a BM compressed data (Step S111). The BM compressed data is expanded by the compression-expansion unit 12 to be a bitmap data (Step S112). The bitmap data is transmitted to the printing unit 6 to execute the printing of the image data (Step S113).

Next, the format of the image data stored in the print memory 18 is selected (Step S114). The selection process for the data format is executed by one of the first through fifth modes shown in FIG. 3 through FIG. 7. When the printer language data is selected, the printer language data will be stored into the print memory 18. In the meantime, the BM compressed data stored in the working memory 17 at Step S111 will be deleted. If the BM compressed data is selected, the BM compressed data will be stored in the print memory 18, while the printer language data stored in the working memory 17 at Step S102 will be deleted.

Next, the page number "N" is compared with the variable "M" (Step S115). If the page number "N" is larger than "M," the variable "M" is incremented by 1 (Step S116), and the process returns to Step S110. Therefore, the process of the printer language for the second page of the first copy begins if the page number "N" is more than one.

Steps S110–S116 are repeated until the printing process and the selection process for the data format are completed and the condition of M<N is no longer satisfied. Consequently, the variable "M" that represents the page currently being processed will be incremented repeatedly until it becomes equal to the page number "N."

In this manner, the printing process and the selection process for the data format are executed page by page. When the variable "M" becomes equal to the page number "N" at Step S116 and the printing process and the selection process of the data format for the last page of the first copy are completed (Steps S110 through S114), the condition M<N is no longer satisfied at Step S115. Accordingly, the process proceeds to Step S117 to begin the process for the second copy as shown in FIG. 8B.

Thus, when the process for the first copy is completed, the image data for the first page through the last page, or the N-th page, is stored in the print memory 18 page by page either as a print language data or as a BM compressed data to form the print file. Since the data format for each page is generally not identical, the image data stored in the print memory 18 contains the printer language memory data and the BM compressed data.

Now, the printing process for the second copy and the rest of the copies is described referring to FIG. 8B. The printing process for the second copy and the rest of the copies is executed based on the print file prepared in the printing process for the first copy.

First, a variable "B" that represents the copy currently being processed is set to 2 (Step S117) and the variable "M" that represents the page currently being processed is set to 1 (Step S118). Next, the image data for the first page stored in the print memory 18 is judged whether it is a printer language data or not (Step S119).

When the image data for the first page is stored as a printer language data, the printer language data is retrieved from the print memory 18, rasterized and developed into the bitmap data (Step S120). The bitmap data is transmitted to the printing unit 6, and the image data is printed (Step S121).

On the other hand, if the image data for the first page is stored as a BM compressed data at Step S119, the BM compressed data is retrieved from the print memory 18, and expanded by the compression-expansion unit 12 to be a bitmap data (Step S122). The bitmap data is transmitted to the printing unit to print the image data (Step S121).

After the transmission of the bitmap data for the first page of the second copy to the printing unit 6 is completed at Step S121, the variable "M" that represents the page currently being processed is compared with the page number "N" (Step S123). If the page number "N" is greater than the variable "M," the variable number "M" is incremented by 1 (Step S124), and the process returns to S119. Therefore, if the page number "N" is more than one, the variable "M" is set to 2, and the printing process for the second page of the second copy will be executed similar to the process of the first page.

Steps S119 through S124 will be repeated until the printing process for all the pages for the second copy is completed and the condition M<N is no longer satisfied. In other words, the variable "M" is repeatedly incremented by 1 until it becomes equal to the page number "N."

In this manner, the printing process for the second copy is executed page by page. When the variable "M" becomes equal to the page number "N" at Step 124 and the printing process of the last page for the second copy is completed (Step S119 through S122), the condition of M<N is no longer satisfied at Step 123. Accordingly, the variable "B" that represents the copy currently being processed is incremented by 1 (Step S125). Next, the variable "B" is compared with the number of copies "A" (Step S126). If the variable "B" is equal to or smaller than the number of copies "A," the process returns to the Step S118. Therefore, the printing process of the third copy is executed similar to that of the second copy if the number of copies "A" is more than two.

Steps S118 through S126 are repeated until the printing process of the A-th copy, or the last copy, is completed and the condition B≦A is no longer satisfied.

As described above, the image data is stored page by page either as a printer language data or a BM compressed data according to the mode applied at Step S114 to form a print file during the printing process for the first copy. The printing process for the second copy and the rest of the copies are executed according to the print file. Therefore, shortening of the printing process and/or effective use of the storage device can be achieved in the second copy and the rest of the copies according to a selected mode, i.e., one of the first through fifth modes shown in FIG. 3 through FIG. 7.

Embodiment 2

Embodiment 2 relates to a printer with reprinting capability. The reprinting capability is a capability of printing an image data, after printing it once following instructions of a computer, without receiving the same image data from the computer again. More specifically, the reprinting capability is to execute the next printing based on the image data, or the print file stored in the storage device of the printer in the first printing.

In Embodiment 1, an image data is printed without being stored in the print memory 18 when the number of copy specified by the computer is one (FIG. 8A). However, in Embodiment 2, an image data is stored in the print memory 18 page by page to form a print file even if the number of copies to be made is one. In order to clarify the difference between Embodiment 1 and Embodiment 2, an instance where the number of copies is one is cited.

Figure 9:
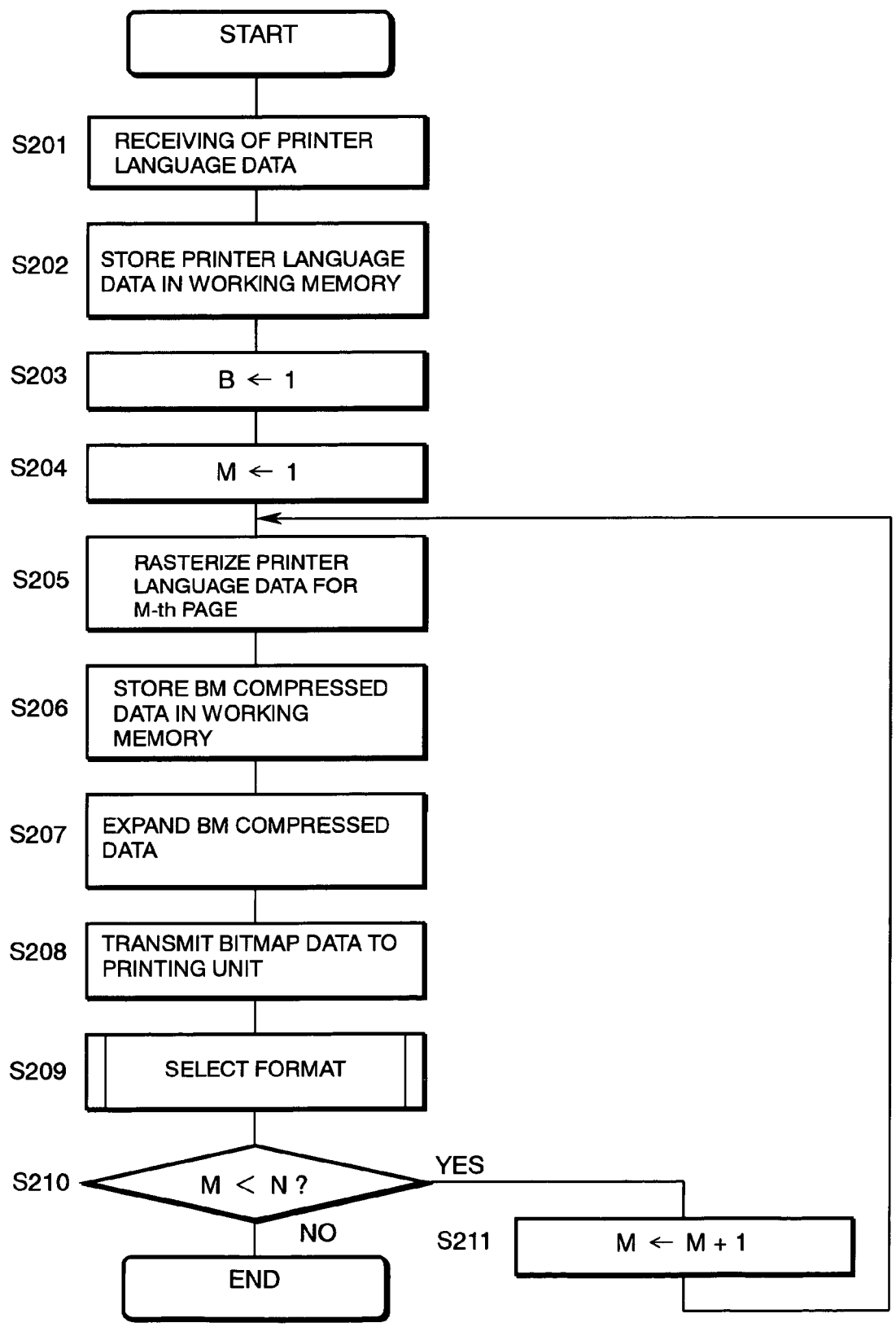
FIG. 9 is a flow chart for the operation in a printer according to a second embodiment.

Now, the process of printing the first copy is described referring to FIG. 9 in the following.

First, a printer language data, the number of copies "A" and the number of pages per copy "N" are received (Step S201), and the printer language data is stored in the working memory 17 (Step S202). As the printing process begins with the printing of the first page of the first copy, a variable "B" that represents the current copy to be printed is set to 1 (Step S203) and a variable "M" that represents the page currently being processed to 1 (Step S204). As shown above, different from Embodiment 1, Embodiment 2 does not have a step to determine whether the number of copies is 1 or more than one. Thus, the image data is stored in the print memory 18 to form a print file even if the number of copy is 1.

Next, the printer language data of the first page is rasterized to become a bitmap data (Step S205). The bitmap data is compressed and stored in the working memory 17 as a BM compressed data (Step S206). Next, the BM compressed data is expanded to become a bitmap data (Step S207). The bitmap data is transmitted to the printing unit 6 to have the image data printed (Step S208). Next, the format of the image data to be stored in the print memory 18 is selected (Step S209).

The selection of the data format at Step S209 is executed according to either one of the first through the fifth modes shown in FIG. 3 through FIG. 7. When a printer language data is selected, the printer language data is stored in the print memory 18, while the BM compressed data stored in the working memory 17 at Step S206 will be deleted. When the BM compressed data is selected, the BM compressed data will be stored in the print memory 18, while the printer language data stored in the working memory 17 at Step S202 will be deleted.

Next, the page number "N" and the variable "M" will be compared (Step S210). If the page number "N" is larger than the variable M, the variable "M" is incremented by 1 (Step S211), and the process returns to Step S205. Therefore, if the page number "N" is more than one, the process of the printer language data for the second page of the first copy begins.

Steps S205 through S211 will be repeated until the printing of all pages of the first copy and the selection of the format are completed and the condition of M<N is no longer satisfied. In other words, the variable "M" that represents the page currently processed is incremented by 1 repeatedly until it becomes equal to the number of pages "N."

Accordingly, when the process of the first copy is finished, the image data for the first page through the last page, or the N-th page will be stored page by page as a printer language data or a BM compressed data in the print memory 18 to form the print file.

Figure 10:
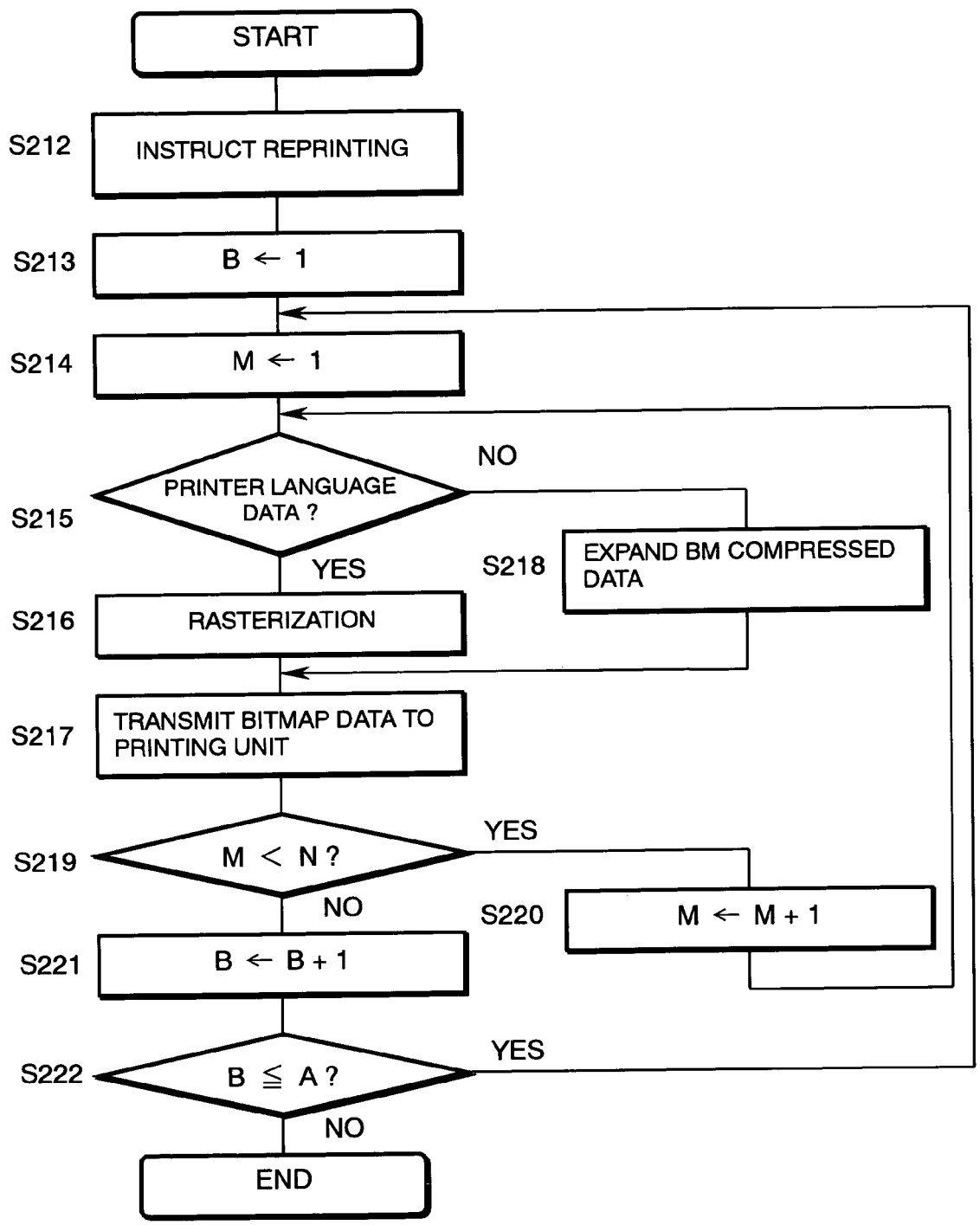
FIG. 10 is a flow chart for the image data processing in the printer.

Next, the reprinting process will be described referring to FIG. 10.

First, reprinting is instructed and the number of copies "A" is entered (Step S212). The instruction of the reprinting is entered not by the computer but by, for example, an operating panel provided at the printer 4. Next, the variable "B" that represents the number of the copy currently being processed will be set to 1 (Step S213), and the variable "M" that represents the page currently being processed will be set to 1 (Step S214). Next, the image data for the first page stored in the print memory 18 is judged whether it is a printer language data or not (Step S215).

If the first page image data is stored as a printer language data, the printer language data will be called from the print memory 18, and rasterized to become a bitmap data (Step S216). The bitmap data is transmitted to the printing unit 6 and the image data will be printed (Step S217).

On the other hand, if the image data of the first page is a BM compressed data at S215, the BM compressed data is retrieved from the print memory 18, and expanded by the compression-expansion unit 12 to become a bitmap data (Step S218). The bitmap data is transmitted to the printing unit 6 to be printed out (Step S217).

After the transmission of the bitmap data of the first page to the printing unit 6 is completed at Step S217, the variable "M" is compared with the page number "N" (Step S219). If the page number "N" is larger than the variable "M," the variable "M" is incremented by 1 (Step S220) and the process returns to Step S215. Thus, if the page number "N" is more than one, the variable "M" is set to 2, the process of printing the second page proceeds similar to the process of the first page.

Steps S215 through S220 are repeated until the printing process of all the pages is completed and the condition of M<N is no longer satisfied. In other words, the variable "M" is incremented by 1 repeatedly until it becomes equal to the page number "N" (Step S221). After the printing process of all the pages is completed, the variable "B" that represents the number of the copy currently being processed is incremented by 1 (Step S221). Next, the variable "B" is compared with the number of copies "A" (Step S222). If the variable "B" is equal or smaller than the number of copies "A," the process returns to the Step S214. Thus, if the number of copies "A" is more than one, the processing of the second copy begins.

Steps S214 through S222 are repeated until the printing process for the A-th copy, or the last page is completed and the condition B≦A is no longer satisfied.

As shown above, the print file used for the printing process of the second copy and the rest of the copies in the Embodiment 1 is used for the reprinting process in Embodiment 2. Although Embodiment 1 and Embodiment 2 are different in terms of the objects of the usage of the print file, the content of the process is the same in both cases.

Moreover, although Embodiment 2 is described in the above around a case where the number of copies to be produced is instructed by the computer to be 1, the same description holds for a case where a plurality of copies is to be produced. For example, the printing of the second copy and the rest of the copies can be processed based on the print file formed by the printing of the first copy same as in the case of Embodiment 1.

Embodiment 3

When the computer 2 is instructing the printer 4 to print "A" number of copies, in reference to FIG. 2, the printer 4 executes the printing of the first copy to the last copy, or the A-th copy. However, if the number of copies "A" is large, the workload on the printer 4 becomes heavy, and the printing time becomes longer.

In case of Embodiment 3, in order to reduce the workload of the first printer, or the printer which is instructed by the computer to print "A" number of copies, a portion "C" of the number of copies "A" is delegated to the second printer or, the different printer connected to the first printer via the network. On the other hand, the second printer prints the delegated number "C" copies, based on the print file transmitted from the first printer. In other words, Embodiment 3 provides an integrated printer function using a plurality of printers connected to a network.

More specifically, the first printer prints a copy of the image data without storing it when it receives an instruction for printing one copy only. When it receives an instruction for printing a plurality of copies, it produces a print file during the printing of one copy. The print file is composed of the image data stored in the print memory 18 page by page as a BM compressed data or a printer language data according to a selected mode. The first printer transmits the print file to the second printer to execute the printing of the "C" portion of the "A" copies, while printing the rest of the "A" copies.

Figure 11A:
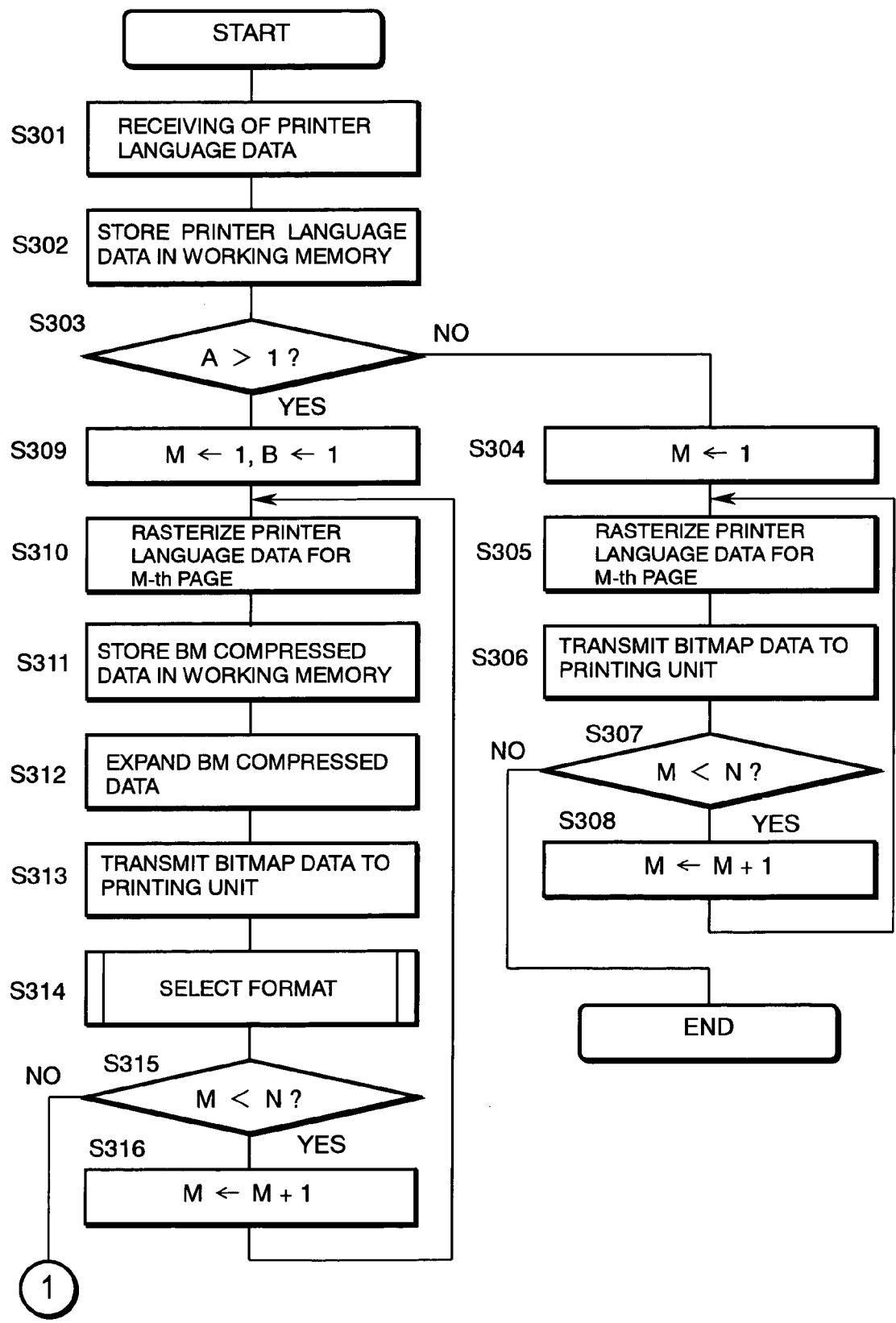
FIG. 11A and FIG. 11B are flow charts for the operation in a printer according to a third embodiment.
Figure 11B:
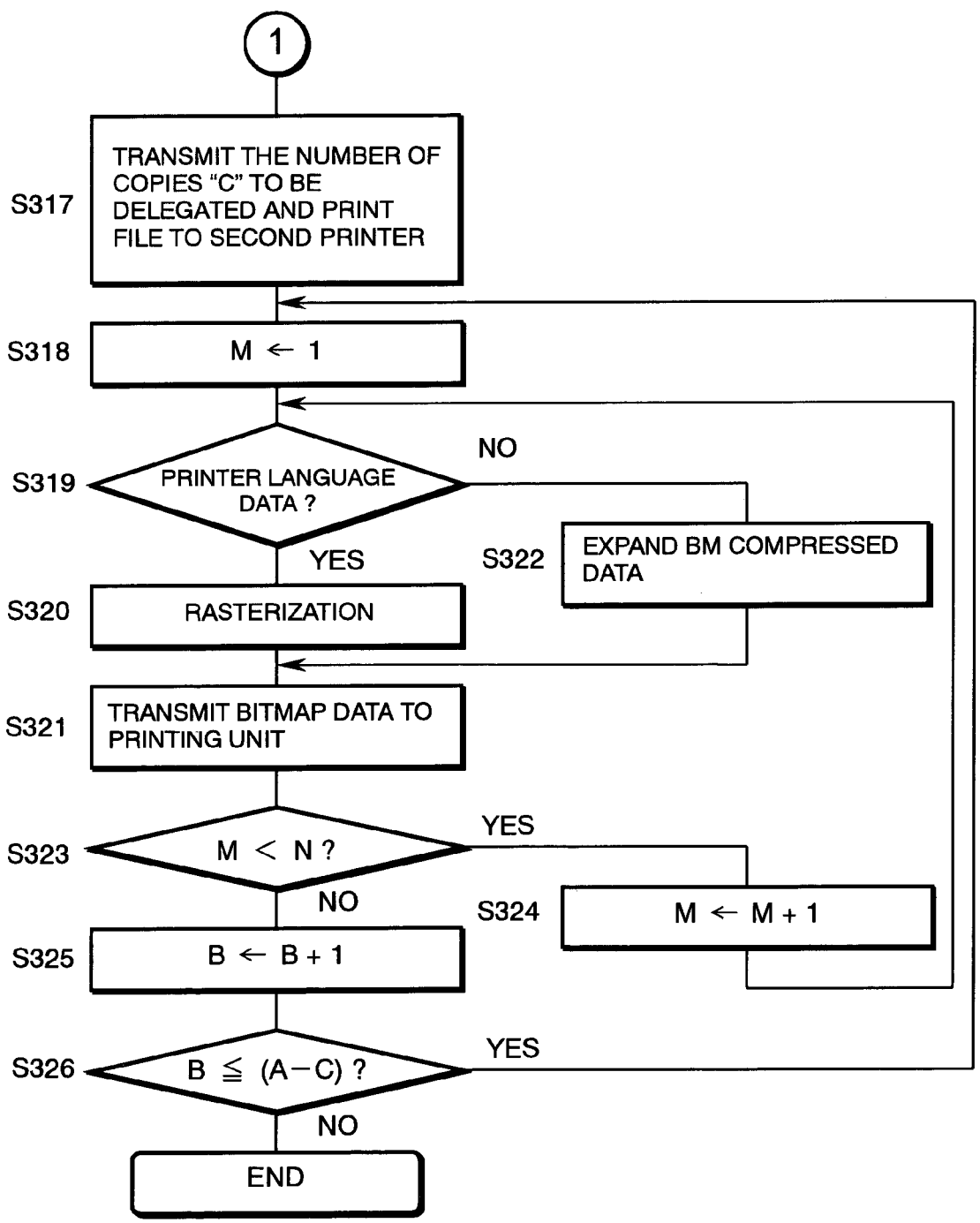

Next, the processing of the first and second printers will be described more specifically. However, the description of the printing process of the first printer shown in FIG. 11A and FIG. 11B is outlined as it is similar to the process according to Embodiment 1 shown in FIG. 8A and FIG. 8B.

The first printer prints the image data without storing the image data (Steps S304 through S308) when it receives an instruction for only one copy (Steps S301 through S303). However, when it receives an instruction for a plurality of copies (Steps S301 through S303), the image data is stored in the print memory 18 page by page as a BM compressed data or a printer language data according to a selected mode, to produce a print file during the printing process for the first copy (Steps S309 through S316).

After the printing process for the first copy is completed, the first printer transmits the number of copies "C" to be delegated and the print file to the second printer (Step S317). The number of copies "C" is entered through a setup panel of the first printer. However, The computer 2 may be adapted for setting up the number of copies "C". If either one of the first mode, the third mode and the fifth mode shown in FIG. 3, FIG. 5 and FIG. 7 is applied in order to prepare the print file, the reduction of the print file volume is attempted. This means the reduction of the data volume to be transmitted from the first printer to the second printer, which contributes to the reduction of the network load and the reduction of the transmission time.

Next, the processing of the second copy and the rest of the copies is conducted (Steps S318 through S326). This process is identical to the cases of Embodiment 1 and Embodiment 2 except the fact that the number of copies actually printed by the first printer is the number of copies "A" specified by the computer minus the number of copies "C," which is the number of copies delegated to the second printer. In other words, they are the same with respect to the fact that the number of copies and the number of pages are controlled using the variable "B" that represents the copy currently being processed and the variable "M" that represents the page currently being processed.

When Steps S318 through S326 are repeated to execute the printing process of the N-th page of the (A–C)-th copy, the variable B is set to (A–C) at Step S325. Therefore, since the condition "B<(A–C)" at Step S326 is not satisfied, it is judged that the printing process of (A–C) copies, for which the first printer is responsible, is completed and the process in the first printer terminates (Step S326).

Figure 12:
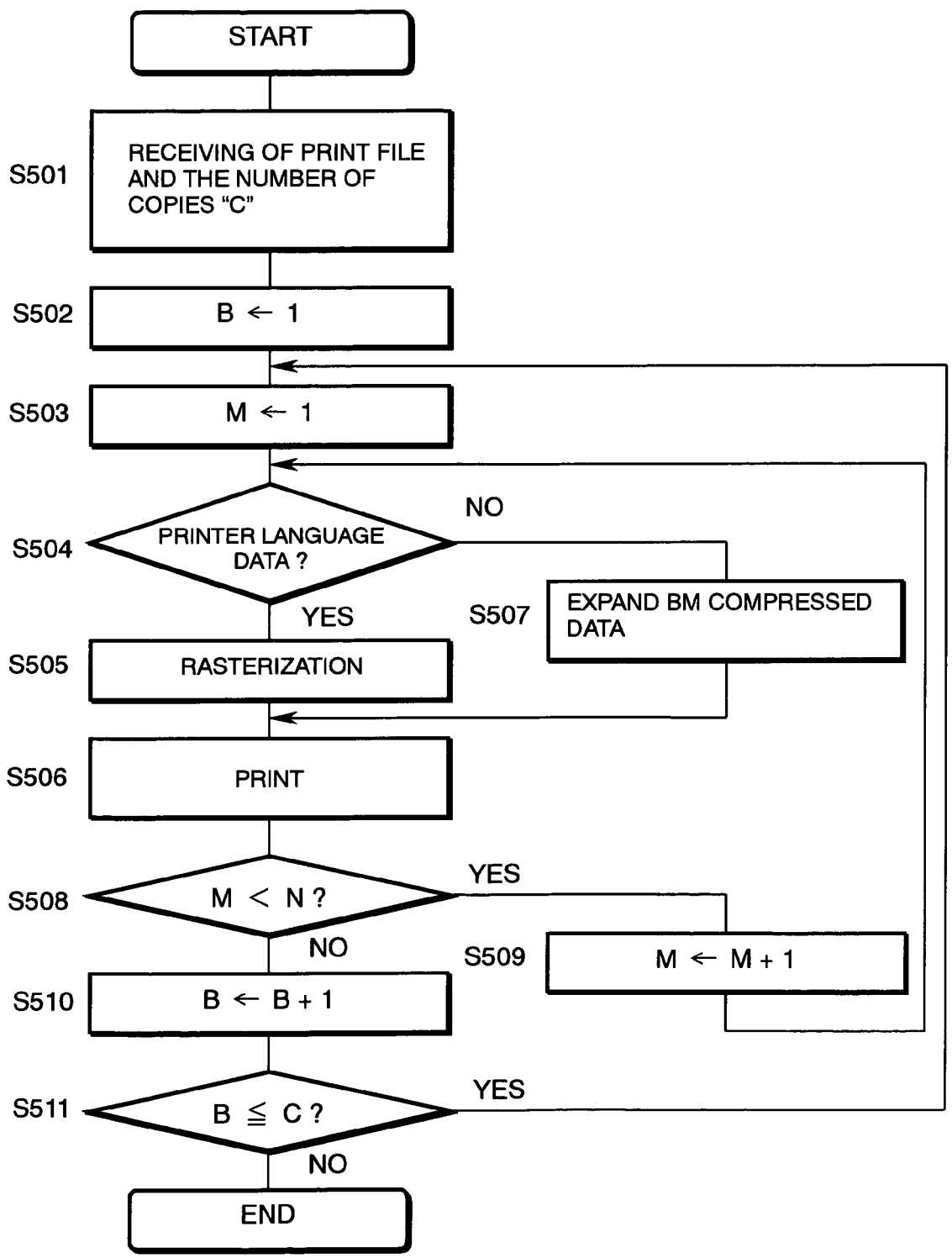
FIG. 12 is a flow chart for the image data processing in the printer.

Now, the process in the second printer is described referring to FIG. 12. The process in the second printer is generally identical to the process of the reprinting in Embodiment 2 (refer to FIG. 10) except that it uses the print file transmitted from the first printer and the number of copies "C."

First, the print file transmitted from the first printer and the number of copies "C" are received (Step S501). The print file is prepared during the printing process of the first copy by the first printer and composed of the image data stored in the print memory 18 page by page as a BM compressed data or a printer language data according to a selected mode.

Next, the variable "B" that represents the copy currently being processed is set to 1 (Step S502), and the variable "M" that represents the page currently being processed is set to 1 (Step S503). Next, it is judged whether the image data is stored in the format of a printer language data or a BM compressed data (Step S504). If a printer language data is stored, the printer language data will be rasterized to become a bitmap data (Step S505). If a BM compressed data is stored, the BM compressed data will be expanded by the compression-expansion unit 12 to become a bitmap data (Step S507).

Next, the bitmap data thus obtained is transmitted to the printing unit 6 to have the image data printed (Step S507). Next, the variable "M" is compared with the number of pages per copy "N" (Step S508). If the page number "N" is larger than the variable "M," the variable "M" is incremented by 1 (Step S509), and the process will return to the Step S504.

After the variable "M" becomes equal to the page number "N" by repeating Steps S504 through S509, the variable "B" that represents the copy currently being processed is incremented by 1 (Step S510). Next, the variable "B" is compared with the number of copies "C" (Step S511). If the number of variable "B" is smaller or equal to the number of copies "C," the process returns to the Step S503.

When the variable "B" becomes larger than the number of copies "C" by repeating Steps S503 through S511, the process of printing "C" copies delegated to the second printer is judged to have been completed and the process in the second printer terminates.

The print file is prepared according to the mode applied at Step S314, one of the first mode through the fifth mode shown in FIG. 3 through FIG. 7, for the purpose of the effective use of the storage device and/or for the reduction of the printing process time in the first printer. As a result, the effective use of the storage device and/or the reduction of the printing process time are achieved also in the second printer that uses the same print file. In particular, if either of the first mode, the third mode or the firth mode is applied, the effective use of the storage device, or the reduction of the print file volume is achieved. It results in reducing the data volume transmitted from the first printer to the second printer and contributing to the reduction of the network load and the reduction of the transmission time.

Embodiment 4

Embodiment 4 relates to measures to cope with the printing error, which occurs in a printer that can delegate printing to a different printer connected to a network. Specifically, the first printer, or the printer for which the printing instruction has been issued by a computer, generally prints all the copies, but delegates the printing of the remaining copies to the second printer, or the different printer, when the printing of the image data cannot be completed due to an error, etc. Thus, Embodiment 4 is different from Embodiment 3, which provides an integrated printing function using a plurality of computers.

The printing errors include out of paper, paper jam, out of toner, etc., which can be detected by sensors attached to the printer. Since the sensors are those that are normally provided on the page printer, and their structures and functions are similar to those normally used, their descriptions are omitted here.

More specifically, the first printer transmits a print file stored in the print memory 18 to the second printer when an error occurs. The print file is prepared according to one of the first through the fifth mode shown in FIG. 3 through FIG. 7 as in Embodiment 3, and consists of a image data, which is a mixture of printer language data and BM compressed data formed page by page. The mode is selected from the standpoint of the effective use of the storage device (the reduction of the network load and the reduction of the transmission time) and/or reduction of the printing process time.

Figure 13A:
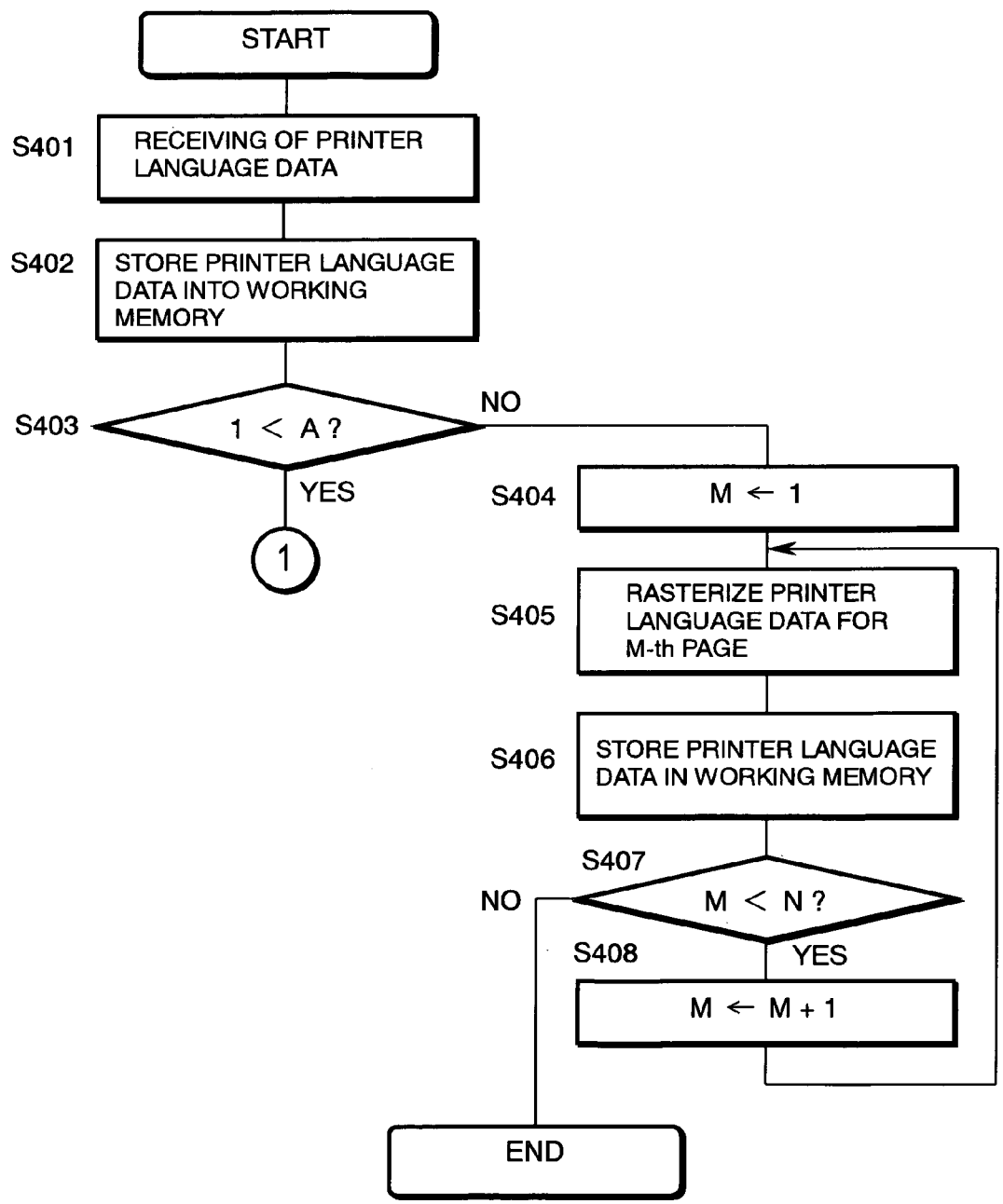

Next, the details of processing the first printer will be described referring to FIG. 13A and FIG. 13B.

First, the information concerning the printing instructions transmitted from the computer 2, or the printer language data, the number of copies "A" and the number of pages per copy "N" are received (Step S401), and the printer language data is stored into the working memory 17 (Step S402). The number of copies "A" is then compared with 1 (Step S403).

If the number of copies "A" is 1, printing will be executed (Steps S404 through S408) without storing the image data similar to Steps S101 through S108 of Embodiment 1 shown in FIG. 8A.

If the number of copies "A" is more than one, the variable that represents the copy currently being processed is set to 1, and also the variable M that represents the page currently being processed is set to 1 (Step S409). Next, the printer language data is rasterized to become a bitmap data (Step S410). The bitmap data will be compressed by the compression-expansion unit 12 and stored in the working memory 17 as a BM compressed data (Step S411). Next, the BM compressed data will be expanded by the compression-expansion unit 12 and become a bitmap data (Step S412).

Next, it determines if there is any printing error (Step 413). If there is no printing error, the bitmap data will be transmitted to the printing unit 6 to cause the image data to be printed (Step S414), and the format of the image data stored in the print memory 18 will be selected (Step S415). If any printing error exists, the bitmap data will not be transmitted to the printing unit 6, and the format of the image data stored in the print memory 18 will be selected (Step S415). The selection will be based on one of the first mode through the fifth mode shown in FIG. 3 through FIG. 7.

Next, the variable "M" is compared with the page number "N" (Step S416). If the page number "N" is larger than the variable "M," the variable "M" is incremented by 1 (Step S417), and the process returns to Step S410.

The condition "M<N" of Step S416 will no longer be satisfied when the variable "M" becomes equal to the page number "N" by repeating Steps S410 through S417. It means that the image data of all the pages is stored in the print memory 18 to form the print file. Next, it is determined whether there is any printing error (Step S419). When there is any printing error, the print file and the number of unfinished copies, or the number of copies "A" are transmitted to the second printer (Step S418), the process in the first printer terminates.

Figure 13C:
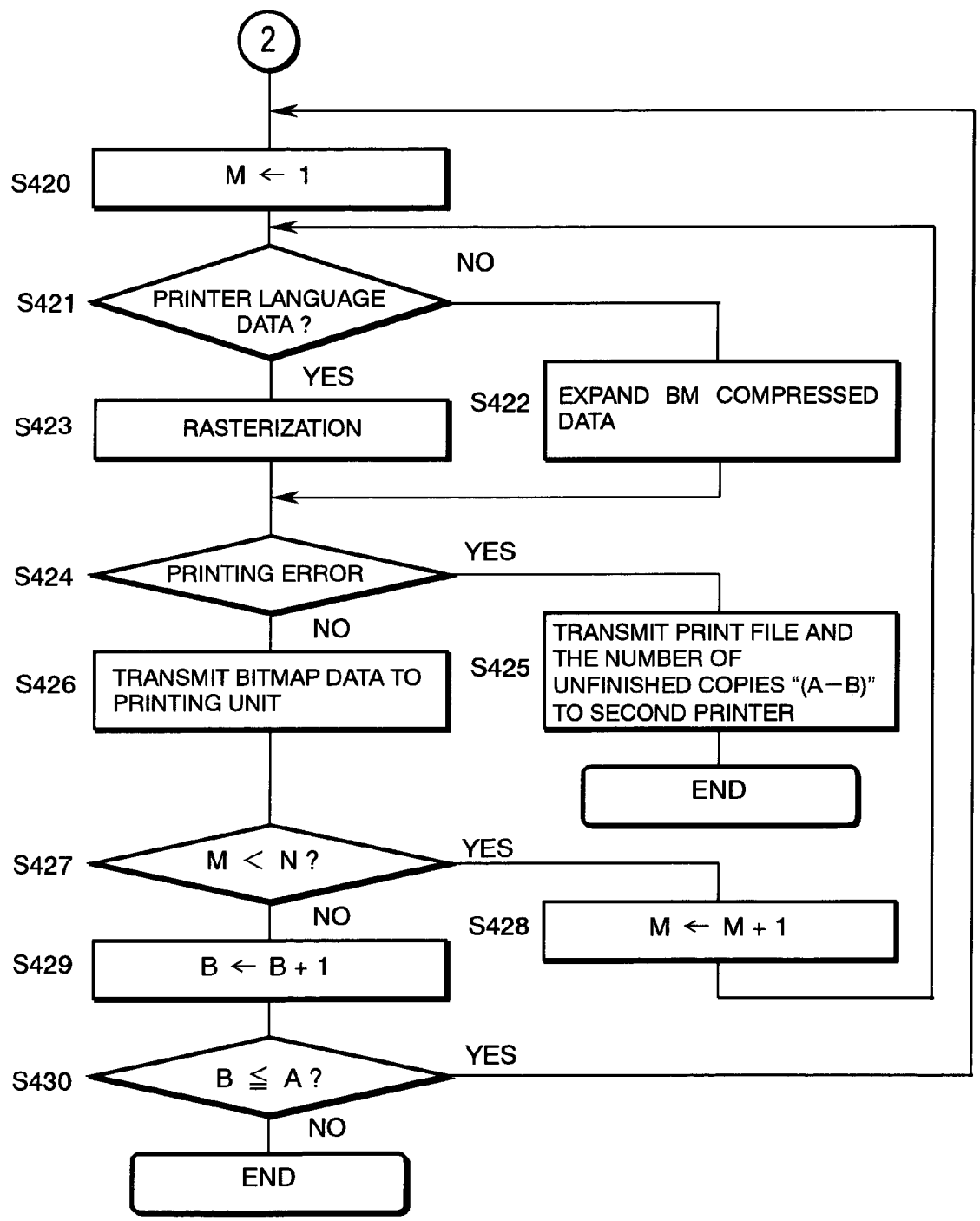

Now, the process of a case when it is determined that the printing error is not occurring at Step S419, or the process for the second copy and the rest of the copies when the image data of the first copy is normally printed is described referring to FIG. 13C.

First, the variable "M" is set to 1, and the process of the first page of the second copy begins (Step S420). Next, it is determined whether the image data stored in the print memory 18 is a printer language data or a BM compressed data (Step S421). If a BM compressed data is stored, the BM compressed data is expanded by the compression-extension unit 12 to become a bitmap data (Step S422). If the printer language data is stored, the printer language data will be rasterized and become a bitmap data (Step S423).

Next, it is judged if there is any printing error (Step S424). When any printing error exists, the print file and the unfinished number of copies will be transmitted to the second printer (Step S425), and the process in the first printer terminates. If the printing error does not exist, the bitmap data will be transmitted to the printing unit 6 to cause the image data to be printed (Step S426), and the variable "M" will be compared with the page number "N" (Step S427). If the page number "N" is larger than the variable "M," the variable "M" is incremented by 1 (Step S428) and the process returns to Step S421. The printing errors are detected by sensors same as in the detection of printing errors for the first copy as described at Step S413.

After the variable M becomes equal to the page number "N" by repeating Step S421 through Step S428, the variable B that represents the copy currently being processed is incremented by 1 (Step S429). Next, the variable B is compared with the number of copies "A" (Step S430). If the variable "B" is smaller than or equal to the number of copies "A," the process returns to Step S420.

The process in the first printer terminates when the variable "B" is larger than the number of copies "C" by repeating Step S420 through Step S430 while there is no printing error. However, if an error occurs during the (B+1)-th copy after having completed the printing of "B" number of copies, the print file and the unfinished (A–B) number of copies will be transmitted to the second printer.

Now, the process in the second printer is described. However, its detail description is omitted here because the process is same as the process according to Embodiment 3 (FIG. 12).

First, the print file and the number of unfinished copies transmitted from the first printer are received. The image data of the print file is judged whether it is stored in the format of a printer language data or a BM compressed data page by page. If a printer language data is stored, it will be rasterized to become a bitmap data. On the other hand, if a BM compressed data is stored, it will be expanded by the compression-expansion unit 12 to become a bitmap data. The bitmap data is transmitted to the printing unit 6 to have the image data printed.

It is also possible to provide a similar function for coping with printing error in the second printer as in the first printer. In this case, the second printer can transmit the print file and the unfinished number of copies to a third printer, or a different printer connected to the second printer via the network, if there is a printing error.

As described above, the first printer, or the printer to which the printing instruction for "A" number of copies is issued by the computer, prints all the number of copies. The printing of the second copy and the rest of the copies are executed based on the print file prepared during the printing of the first copy. However, if a printing error occurs, it is delegated to the second printer, or the different printer connected to the first printer via the network. Also, in a case where the first copy printing is unable due to an error, the first printer prepares a print file for the purpose of delegating the printing of the unfinished number of copies to the second printer. On the other hand, the second printer then prints the unfinished number of copies.

In Embodiment 4, the number of copies to be printed by the second printer is unpredictable as the job is transferred to the second printer as a result of an incidental printing error. In that sense, Embodiment 4 is different from Embodiment 3 where the number of prints to be printed by the second printer is predetermined.

Moreover, the print file is prepared according to the mode applied at Step S415, or one of the first mode through the fifth mode shown in FIG. 3 through FIG. 7 for the purpose of effective use of the storage device and/or the reduction of the printing process time in the first printer. Therefore, the effective use of the storage device and/or the reduction of the printing process time are attempted in the second printer as well, which uses the same print file. In particular, if either of the first mode, the third mode or the firth mode is applied, the effective use of the storage device, or the reduction of the print file volume is achieved. It results in reducing the data volume transmitted from the first printer to the second printer and contributing to the reduction of the network load and the reduction of the transmission time.

Embodiment 5

In Embodiment 1 through Embodiment 4, a printer language data and a BM compressed data are compared as the formats of the image data. However, it is possible to compare an intermediate language data with a BM compressed data. The intermediate language data is an intermediate data between the printer language data and the bitmap data, and is generated in the course of the rasterization of the printer language data. In other words, the rasterization process is equivalent to the emulation of the printer language to generate the intermediate language data from the printer language data and to the conversion of the intermediate language data into the bitmap data.

Figure 14:
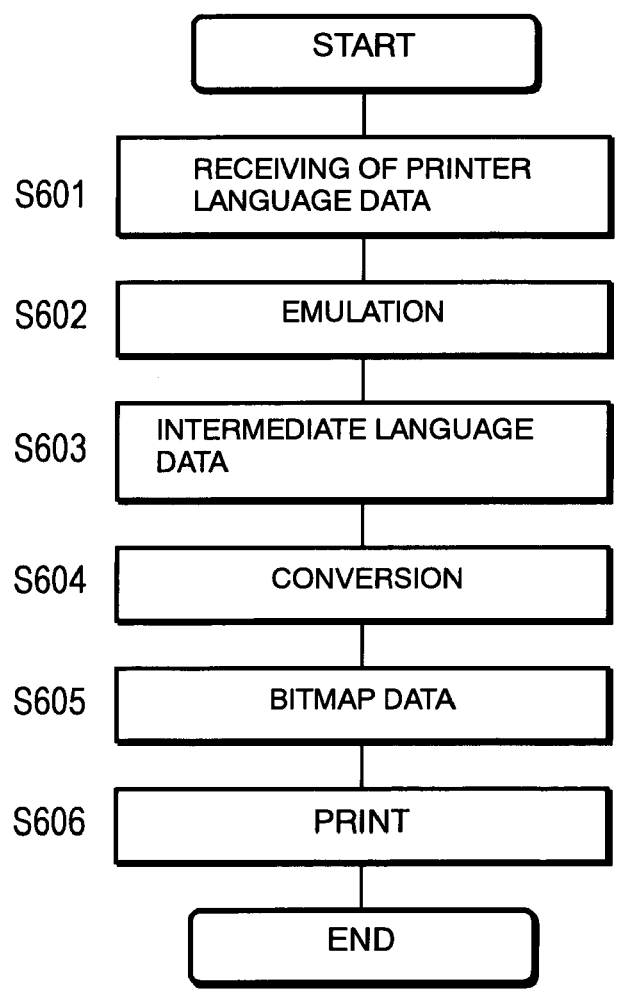
FIG. 14 is a schematic flow chart for the operation in a printer according to a fifth embodiment.

Next, the outline of the printer operation will be described referring to FIG. 14.

In the execution of printing, the first step is to receive the printer language data transmitted from the computer (Step S601). The printer language data is emulated (S602) to produce the intermediate language data (Step S603). The intermediate language is converted into graphics (Step S604) to become a bitmap data (Step S605). Next, the image data is printed based on the bitmap data (Step S606).

The intermediate language data is applicable to the first mode through the fifth mode as a replacement of the printer language data as follows.

In the modified first mode, the data format can be decided based on the volume comparison between the intermediate language data and the BM compressed data. In the modified second mode and the modified fourth mode, the data format can be decided based on the comparison between the printing time and the time required for developing the intermediate language data into the bitmap data. In the modified third mode and the modified fifth mode, the data format is decided based on the comparison between the volume comparison between the intermediate language data and the BM compressed data as well as the printing time and the time required for developing the intermediate language data into the bitmap data.

Thus, the print file is formed according to one of the modified first mode through the modified fifth mode and includes a page by page data of a mixture of an intermediate language data and a BM compressed data. The print file is used for printing/reprinting of the second copy and the rest of the copies or transferred to a different printer for printing. Furthermore, the image data for the print file is judged page by page whether it is formed as an intermediate language data or a BM compressed data. If an intermediate language data is stored, the intermediate language data will be converted into graphics, and into a bitmap data. However, if a BM compressed data is stored, the BM compressed data will be expanded by the compression-expansion unit 12 into a bitmap data. The bitmap data will be transferred to the printing unit 6 to print the image data.

It is obvious that this invention is not limited to the particular embodiments shown and described above but may be variously changed and modified by any person of ordinary skill in the art without departing from the technical concept of this invention.

For example, the mode that determines the data format can have wide varieties and modifications based on the comparison between the printer language data volume and the BM compressed data volume as well as the comparison between the printing time and the time required for developing the printer language data into the bitmap data.

The developing time can be obtained either by measuring the actual time required for developing or by calculating based on the estimation. Since the printing time for one page can be considered approximately constant, it can be substituted with a specified time. Thus, it is possible to compare the specified time and the developing time.

Moreover, the developing time may include the time required for compressing the bitmap data and the time required for expanding the compressed BM data. In other words, it is possible to use the sum of the time required for developing the printer language data into a bitmap data, the time required for compressing the bitmap data, and the time required for expanding the compressed BM data as the developing time. On the contrary, it is possible to use the time required for expanding the compressed BM data as a part of the printing time.

Also, it is possible to constitute the printer in such a way as to make it possible to select the mode from a plurality of choices. In such a case, a desired mode can be arbitrarily selected depending on the usage condition.

Moreover, Embodiment 1 through Embodiment 5 are described to be used for electronic photography printers where the bitmap data is written into a photoconductor in order to print. However, Embodiment 1 through Embodiment 5 can be used for any printers as long as printing is done using the bitmap data developed from the image data for one page. Also, it is possible to use a recording medium other than the photoconductor on which to write the bitmap data. Thus, it is obvious that they can be applied to printers other than the electronic photography type printers.

What is claimed is:

1. A device for processing image data comprising:
   a receiver for receiving a first image data including printer language data;
   a first generator for generating a second image data including bitmap data by developing the first image data;
   a second generator for generating a third image data by compressing the second image data;
   a printing unit for printing on a recording medium using the second image data;
   a first comparator for comparing a first time required for developing the first image data and a second time required for printing with the second image data;
   a second comparator for comparing a volume of the first image data and a volume of the third image data; and
   storage means for storing the first image data if said first comparator judges that the first time is shorter than the second time and if at the same time said second comparator judges that the volume of the first image data is smaller than the volume of the third image data.

2. A device for processing image data comprising:
   a receiver for receiving a first image data including printer language data;
   a first generator for generating a second image data including bitmap data by developing the first image data;
   a second generator for generating a third image data by compressing the second image data;
   a printing unit for printing on a recording medium using the second image data;
   a comparator for comparing, if image data of two pages previous to a current page are stored as the second image data, a first time required for developing the first image data of the current page and a second time required for printing a recording medium using the second image data of the two previous pages; and
   storage means for storing the first image data of the current page if said comparator judges that the first time is shorter than the second time.

3. A device for processing image data comprising:
   a receiver for receiving a first image data including printer language data;
   a first generator for generating a second image data including bitmap data by developing the first image data;
   a second generator for generating a third image data by compressing the second image data;
   a printing unit for printing on a recording medium using the second image data;
   a first comparator for comparing, if image data of two pages previous to a current page are stored as the second image data, a first time required for developing the first image data of the current page and a second time required for printing a recording medium using the second image data of the two previous pages;
   a second comparator for comparing a volume of the first image data of the current page and a volume of the third image data of the current page; and
   storage means for storing the first image data of the current page if said first comparator judges that the first time is shorter than the second time and if at the same time said second comparator judges that the volume of the first image data of the current page is smaller than the volume of the third image data of the current page.

* * * * *